United States Patent [19]

Black, III

[11] Patent Number: 5,583,327
[45] Date of Patent: Dec. 10, 1996

[54] ELECTRICAL AND VACUUM SWITCHING CONTROL APPARATUS FOR AUTOMOTIVE AIR CONTROL SYSTEM

[75] Inventor: Charles E. Black, III, Mount Prospect, Ill.

[73] Assignee: Indak Manufacturing Corp., Northbrook, Ill.

[21] Appl. No.: 196,396

[22] Filed: Feb. 15, 1994

[51] Int. Cl.⁶ .................................................. H01H 9/06
[52] U.S. Cl. .................................. 200/61.86; 137/560
[58] Field of Search ............................ 200/50 C, 520, 200/523, 524, 61.86; 137/353, 560, 596, 625.46, 625.48, 637

[56] References Cited

U.S. PATENT DOCUMENTS

| | | |
|---|---|---|
| 4,383,147 | 5/1983 | Raab et al. ................................ 200/50 C |
| 4,448,390 | 5/1984 | Halstead et al. ................... 200/61.86 X |
| 4,517,422 | 5/1985 | Black, III et al. ..................... 200/50 C |
| 4,679,588 | 7/1987 | Raab et al. ........................ 200/61.86 X |
| 4,716,264 | 12/1987 | Toulouse ............................... 200/61.86 |
| 4,994,635 | 2/1991 | Cummings et al. .................. 200/61.86 |
| 5,420,387 | 5/1995 | Cummings .............................. 200/524 |

Primary Examiner—J. R. Scott

[57] ABSTRACT

The apparatus, which controls the operation and speed of an electrical blower motor and the operation of a vacuum operated recirculation control device, comprises a vacuum switch combined with an electrical switch having a rotary shaft and fixed and movable contacts whereby rotation of the shaft controls the operation and speed of the blower motor. The shaft is pushable rearwardly and is spring-biased forwardly for operating the vacuum switch whereby vacuum is selectively supplied to the recirculation control device for switching between outside air and recirculation of air. A push-push latching mechanism is provided for alternately latching the vacuum switch in one position and releasing the vacuum switch for return movement to its other position.

10 Claims, 17 Drawing Sheets

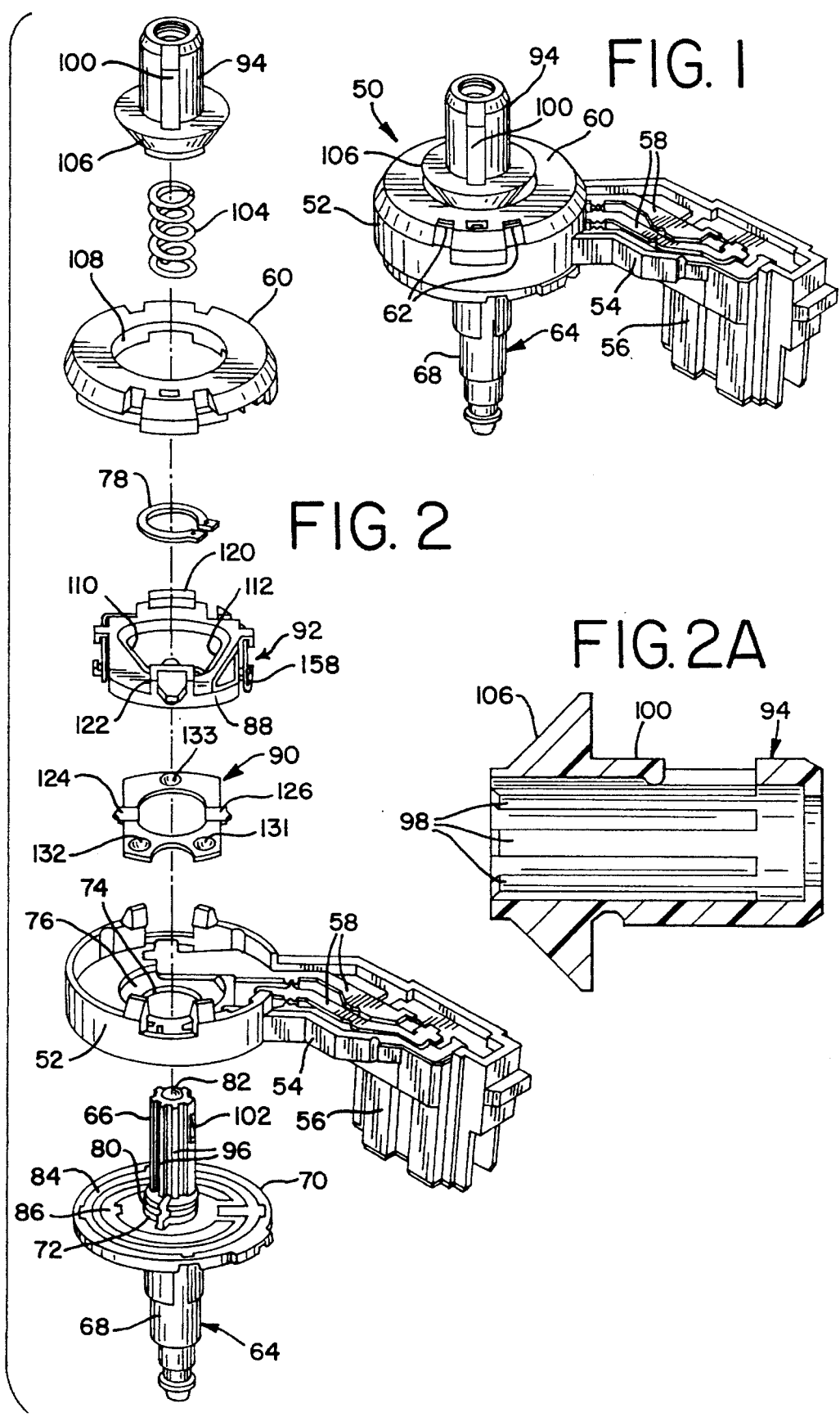

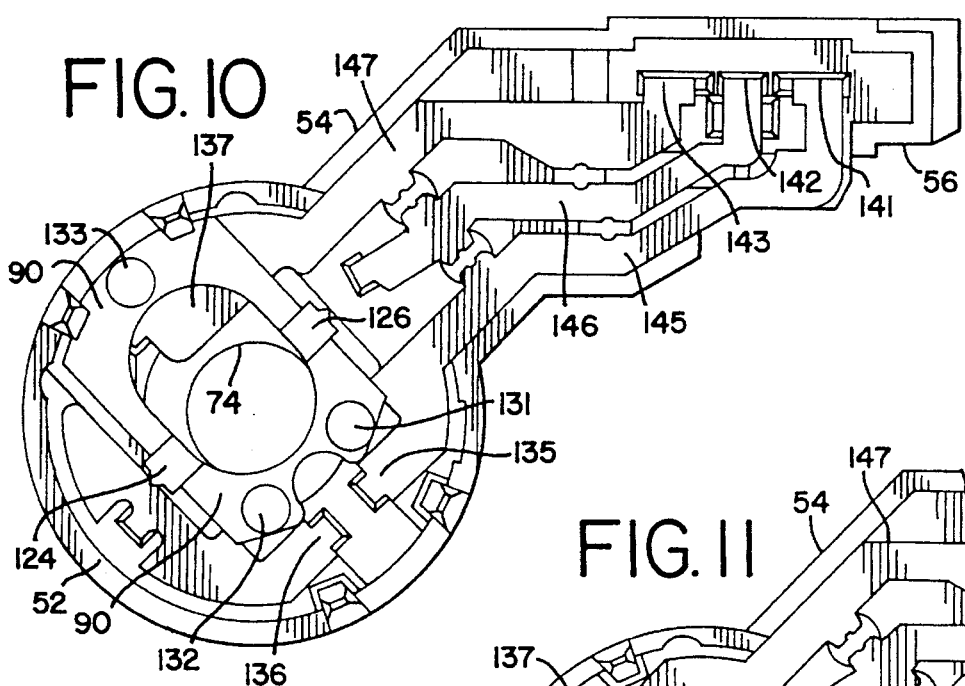

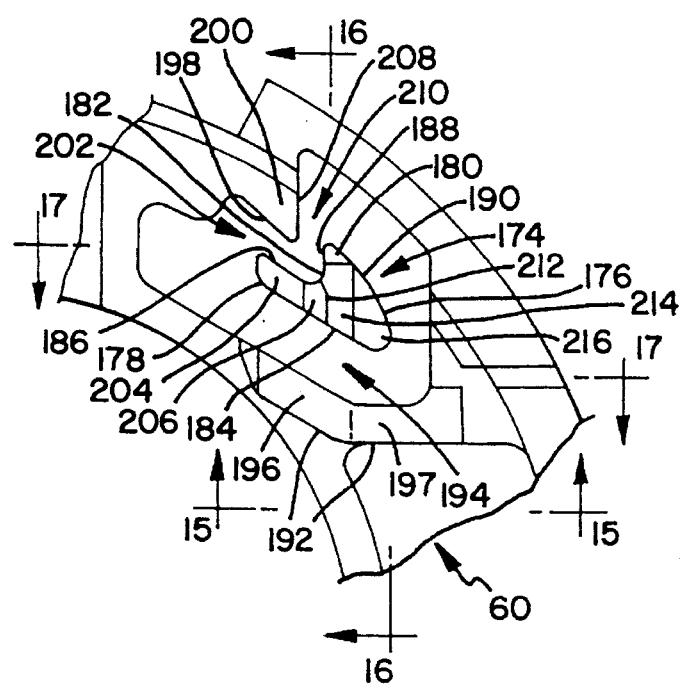
FIG. 14
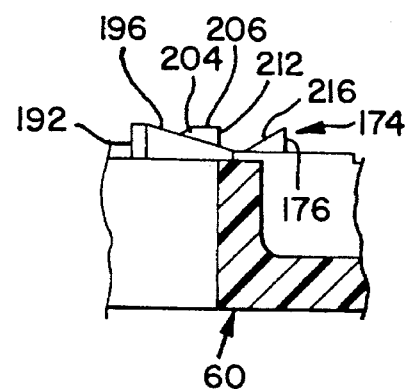
FIG. 15
FIG. 17
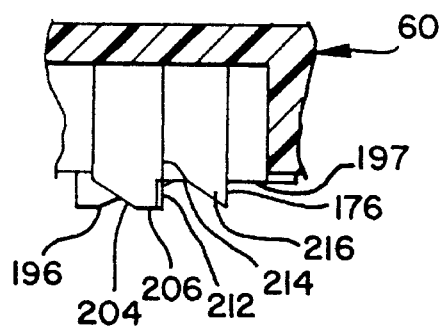
FIG. 16
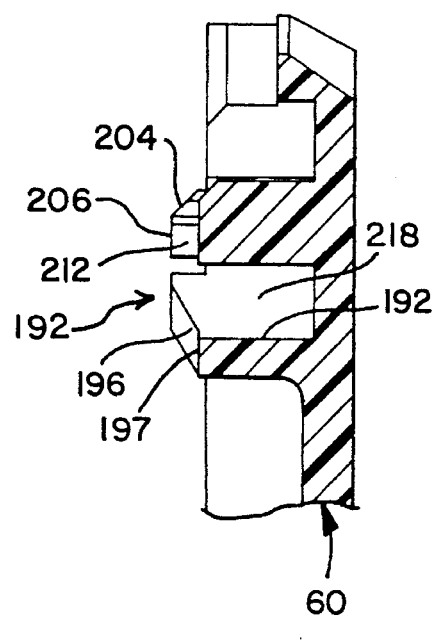

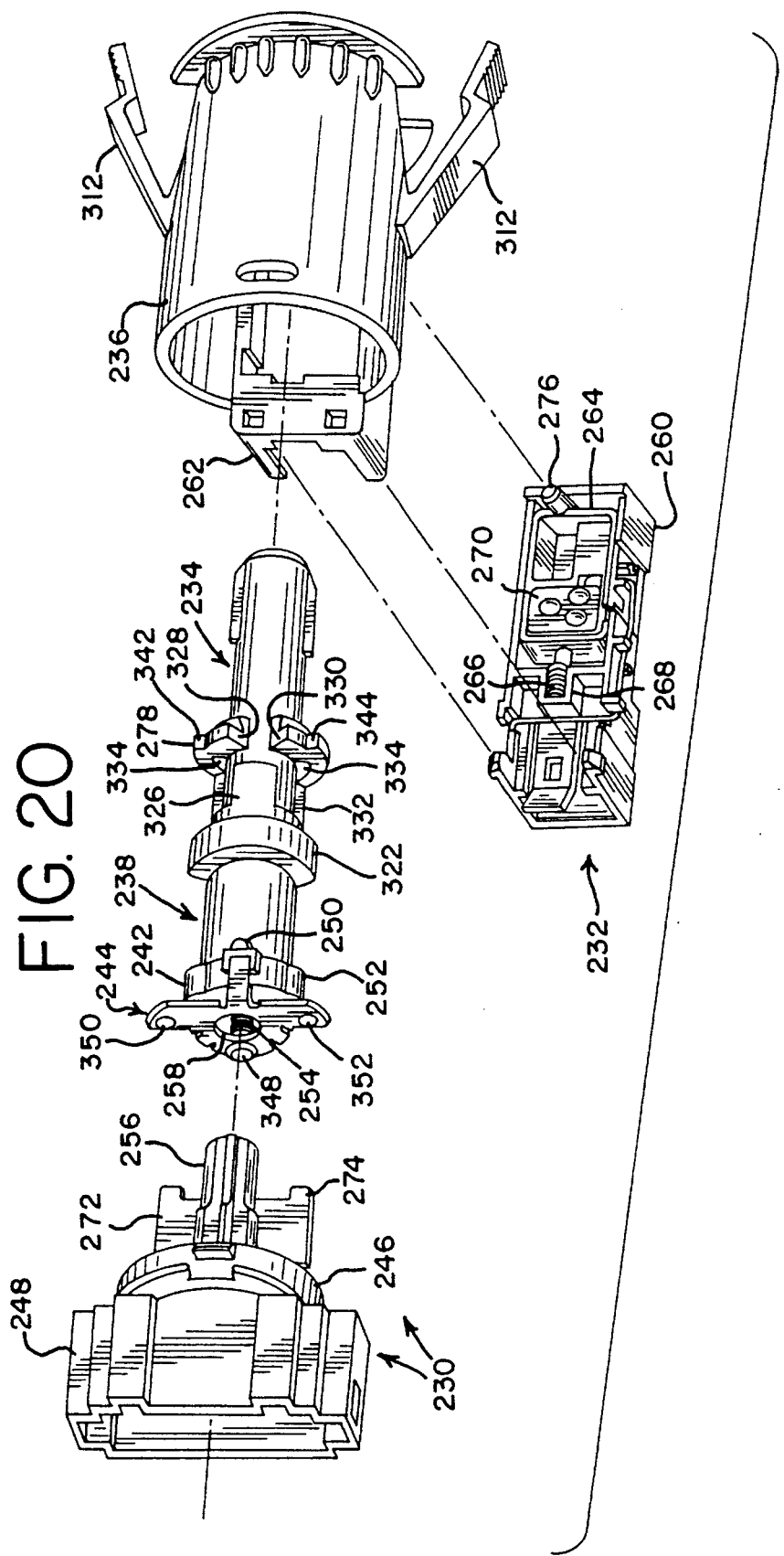

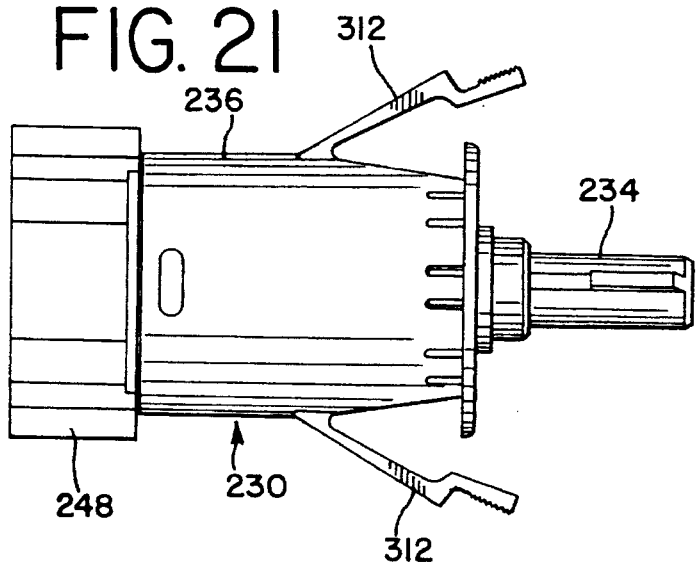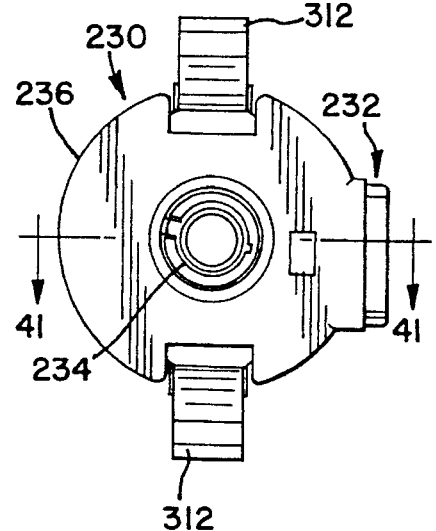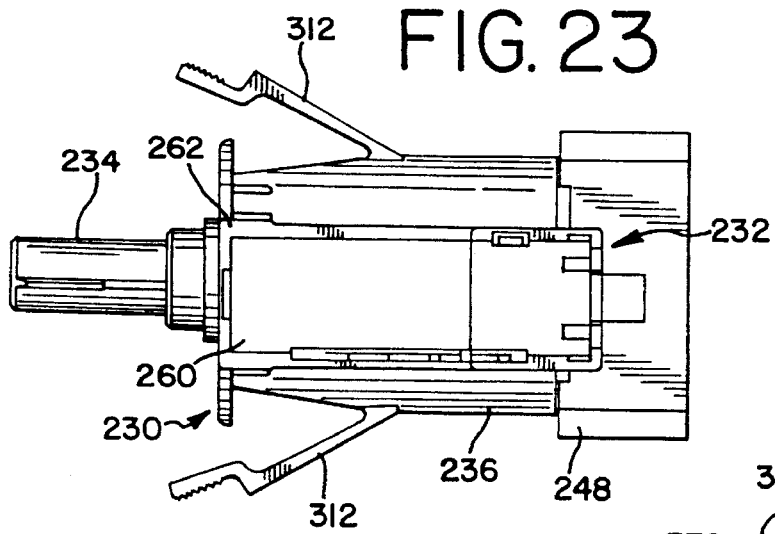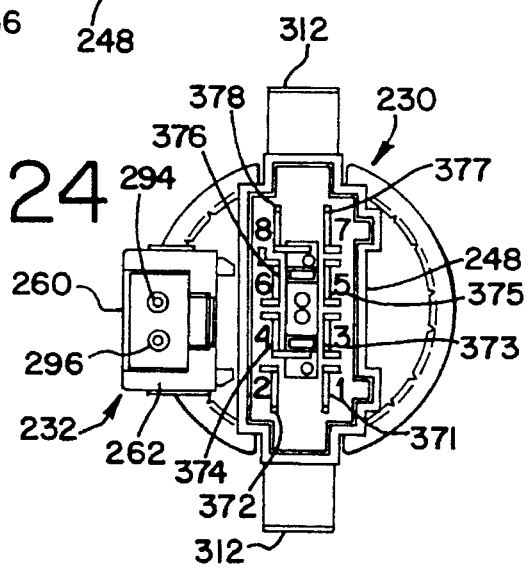

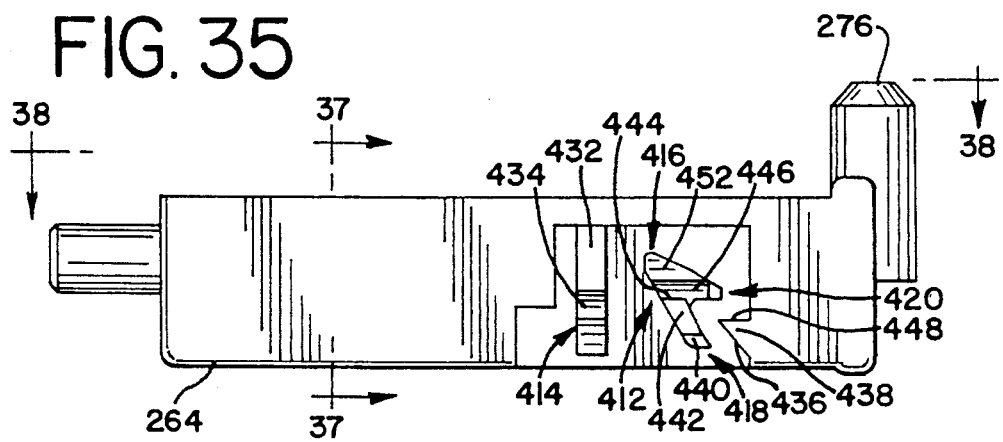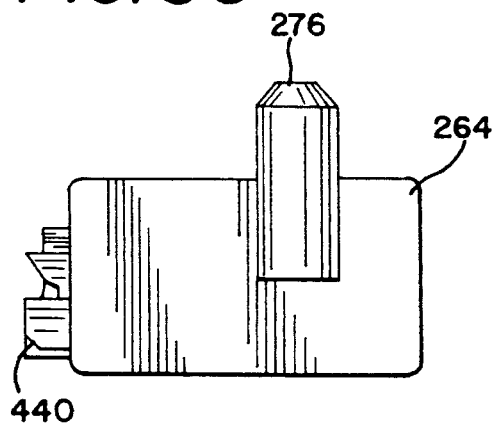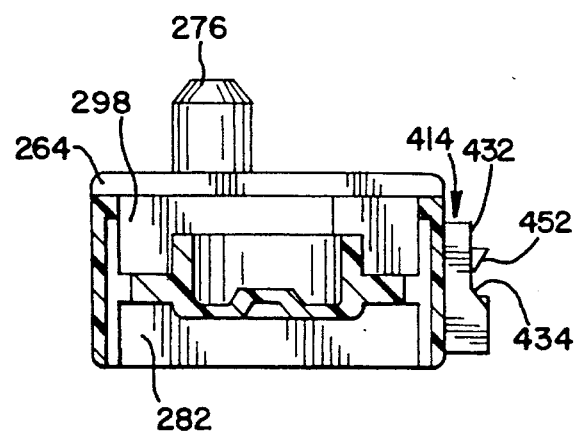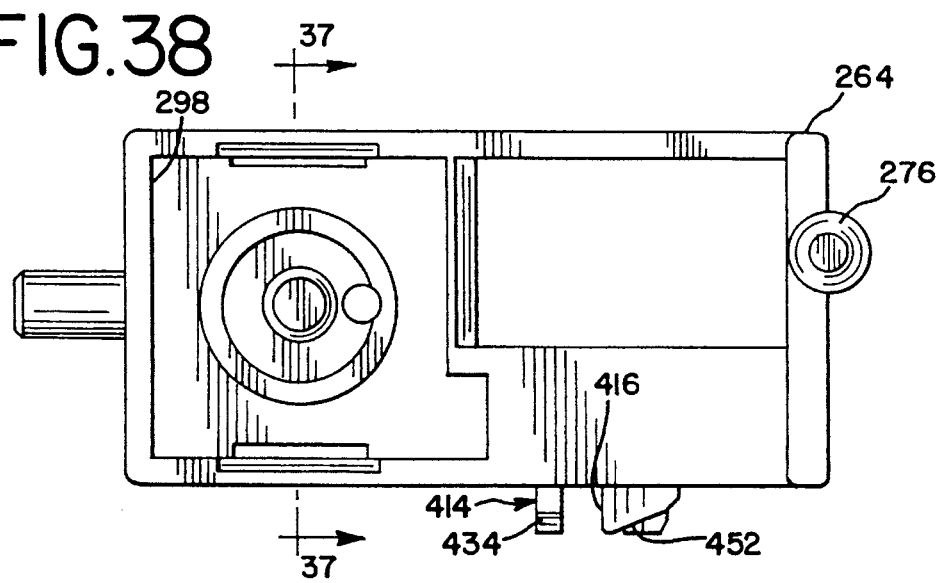

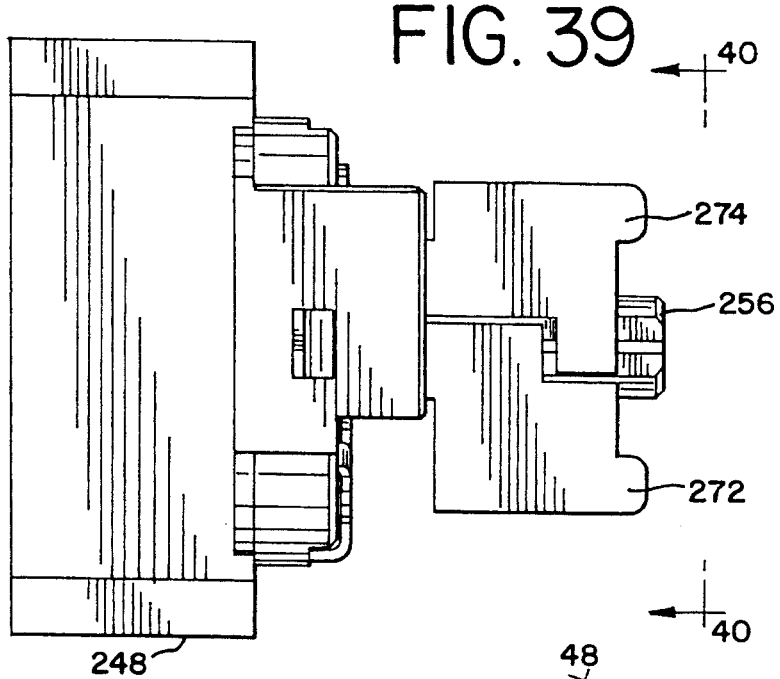
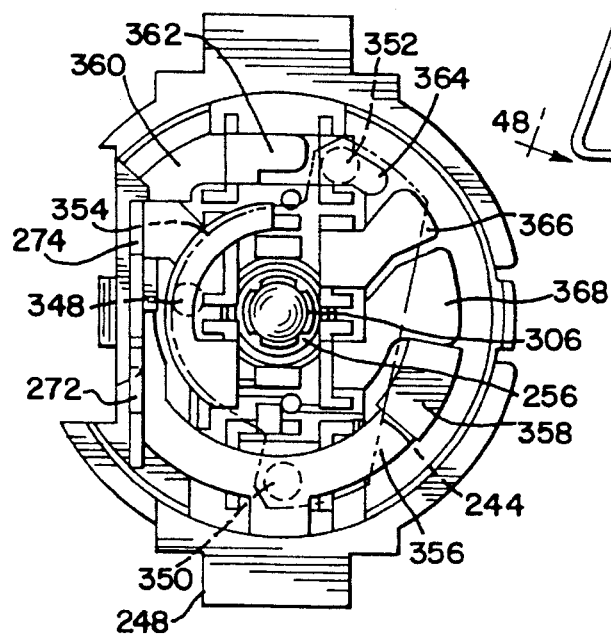
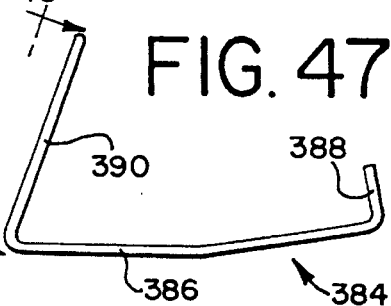
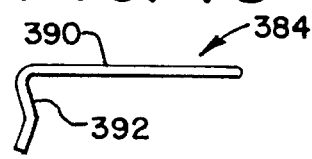
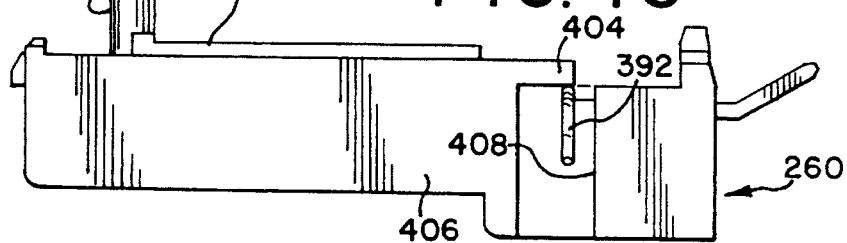

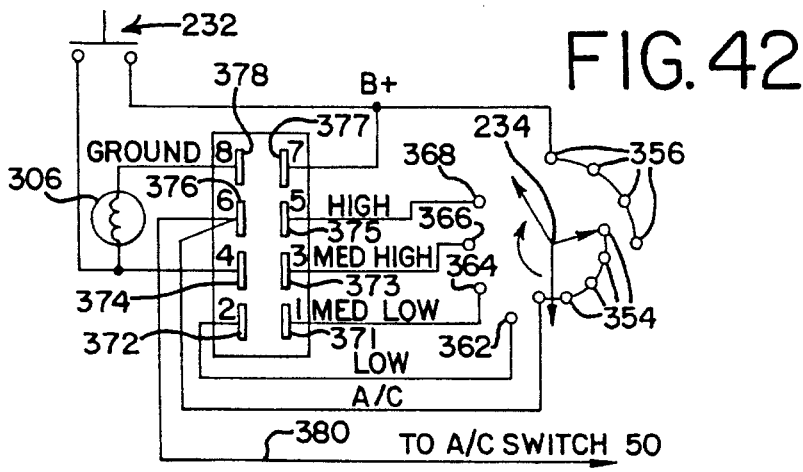

FIG. 42

FIG. 43
ROTARY BLOWER SWITCH

| KNOB ROTARY POSITION | CIRCUIT "MAKE" | HEATER (OR A/C WITH A/C SWITCH IN OFF POSITION) AMPERES | A/C (WITH A/C SWITCH IN ON POSITION) AMPERES |
|---|---|---|---|
| OFF | (NONE) | (NONE) | (NONE) |
| LOW | 2+6+7 | 7 | 14 |
| MEDIUM LOW | 1+6+7 | 12 | 19 |
| MEDIUM HIGH | 3+6+7 | 18 | 25 |
| HIGH | 5+6+7 | 25 | 32 |

PUSH-PUSH RECIRC VACUUM SWITCH

| RECIRC. | VACUUM FUNCTION | | INDICATOR LAMP |
|---|---|---|---|
| | PORT A (SOURCE) | PORT B (RECIRC) | CIRCUIT "MAKE" |
| OFF | VACUUM SEALED) | ATMOSPHERE | (NONE) |
| ON | VACUUM | VACUUM | 7+8 (THRU LAMP) |

FIG. 44

| TERMINAL FUNCTIONS | | |
|---|---|---|
| TERMINAL | FUNCTION | LOAD |
| 1 | MEDIUM LOW SPEED | 12 |
| 2 | LOW SPEED | 7 |
| 3 | MEDIUM HIGH SPEED | 18 |
| 4 | (NOT USED) | - |
| 5 | HIGH SPEED | 25 |
| 6 | A/C OUT (TO A/C SWITCH) | 6 |
| 7 | B+ (IN) | 32 |
| 8 | GROUND (FOR INDICATOR LAMP) | 0.1 |

ELECTRICAL AND VACUUM SWITCHING CONTROL APPARATUS FOR AUTOMOTIVE AIR CONTROL SYSTEM

FIELD OF THE INVENTION

This invention relates to automotive air control systems which provide heating and ventilating and may also provide air conditioning. More specifically, this invention relates to a new and improved control apparatus for an automotive air control system.

BACKGROUND OF THE INVENTION

Typically, an automotive air control system comprises a multispeed blower motor, a blower operable by the motor for delivering air to the cab of the vehicle, heater means for selectively and adjustably heating the air, air conditioning means for selectively cooling and dehumidifying the air, and a recirculation door or other recirculation control device for selecting between outside air and recirculation of the air in the cab of the vehicle. The air conditioning is an option which may be omitted in some instances.

The typical air control system comprises a control apparatus which may employ a multiposition rotary blower switch for controlling the energization and speed of the blower motor. A heater control device is generally provided for shutting off the heat or supplying a variable amount of heat to the air delivered to the cab of the vehicle. Typically, the air conditioning is controlled by an air conditioning (A/C) switch which selectively energizes and de-energizes an air conditioning clutch whereby an air conditioning compressor is selectively driven by the propulsion motor of the vehicle.

Typically, the recirculation door or other control device is operated by a vacuum motor or operator which is adapted to be energized by vacuum from the air intake of the propulsion motor. When the vacuum motor is de-energized, the recirculation door is generally positioned to deliver outside air to the air control system. When the vacuum motor is energized, the recirculation door is moved to a position in which the intake of outside air is completely or partially shut off, and the air in the cab of the vehicle is recirculated through the air control system. The supply of vacuum to the vacuum motor may be controlled by a separate manually operable vacuum switch or valve which typically also controls other vacuum motors for directing the heated or cooled air to floor vents, panel vents and windshield defrosting vents. In some instances, a manually operable electrical switch may be employed to control the vacuum motor which switches between outside air and recirculation. In that case, a relay valve is provided having a solenoid for actuating a vacuum valve. When the electrical switch is closed, the solenoid is energized whereby the vacuum valve is operated to supply vacuum to the vacuum motor.

OBJECTS OF THE INVENTION

One object of the present invention is to provide a new and improved control apparatus whereby the recirculation-controlling vacuum motor is energized and de-energized by means combined with the electrical blower switch without any need for a solenoid-operated relay valve for making and breaking the supply of vacuum to the vacuum motor which operates the recirculation door.

A further object is to provide a new and improved control apparatus in which a vacuum switch or valve is combined with the blower switch for directly controlling the supply of vacuum to the vacuum motor for the recirculation door.

SUMMARY OF THE INVENTION

To achieve these and other objects, the present invention provides control apparatus for an automotive air control system having a blower motor, a vacuum source, a recirculation control device for changing between outside air and recirculation of air, and a vacuum motor for operating the recirculation control device, the control apparatus comprising a rotary blower switch having an input shaft which is rotatable to a plurality of positions for controlling the operation and speed of the blower motor, the input shaft also being pushable rearwardly, the blower switch having resilient means for biasing the shaft forwardly, a vacuum switch combined with the blower switch, a vacuum input line connected between the vacuum source and the vacuum switch, a vacuum output line connected between the vacuum switch and the vacuum motor, the vacuum switch having control means operable by rearward and forward movement of the input shaft for selectively making and breaking a vacuum-transmitting connection between the vacuum input line and the vacuum output line for selectively energizing and de-energizing the vacuum motor in response to rearward and forward movement of the input shaft for selectively operating the recirculation control device to change between outside air and recirculation.

The vacuum switch preferably includes a latching mechanism for alternately latching the vacuum switch in its make position and returning the vacuum switch to its break position.

More specifically, the vacuum switch preferably comprises a push-push latching mechanism operable by successive rearward pushing movements of the input shaft for alternately latching the vacuum switch in its make position and unlatching the vacuum switch for return movement to the break position for alternately energizing and de-energizing the vacuum motor.

The vacuum switch may include spring means for biasing the vacuum switch toward its break position, the vacuum switch also including a latching mechanism for alternately latching the vacuum switch in its make position and unlatching the vacuum switch for return movement to its break position by the spring means.

More specifically, the vacuum switch may include spring means for biasing the vacuum switch toward its break position, the vacuum switch comprising a push-push latching mechanism operable by successive rearward pushing movements of the input shaft for alternately latching the vacuum switch in its make position and unlatching the vacuum switch for return movement by the spring means to its break position for alternately energizing and de-energizing the vacuum motor.

In broader terms, the present invention provides control apparatus for an automotive air control system having a blower motor, a vacuum source, a recirculation control device for changing between outside air and recirculation of air, and a vacuum motor for operating the recirculation control device, the control apparatus comprising a rotary blower switch having an input shaft which is rotatable to a plurality of positions for controlling the speed of the blower motor, the input shaft also being movable axially between outside air and recirculation positions, a vacuum switch combined with the blower switch, a vacuum input line connected between the vacuum source and the vacuum switch, a vacuum output line connected between the vacuum switch and the vacuum motor, the vacuum switch having control means operable by axial movement of the input shaft between its outside air and recirculation positions for selectively making and breaking a vacuum-transmitting connection between the vacuum input line and the vacuum output line for selectively energizing and de-energizing the vacuum motor in response to axial movement of the input shaft between the recirculation and outside air positions for selectively operating the recirculation control device to change between outside air and recirculation.

The control apparatus may also include resilient means for biasing the input shaft toward its outside air position.

The vacuum switch may also comprise a latching mechanism for alternately latching the vacuum switch in its make position and returning the vacuum switch to its break position.

The vacuum switch preferably comprises spring means for biasing the vacuum switch toward its break position, the vacuum switch comprising a latching mechanism for alternately latching the vacuum switch in its make position and releasing the vacuum switch for movement by the spring means to its break position.

In another aspect, the vacuum switch preferably comprises spring means for biasing the vacuum switch toward its break position, the vacuum switch comprising a latching mechanism operable by successive movements of the input shaft to its recirculation position for alternately latching the vacuum switch in its make position and unlatching the vacuum switch for return movement to its break position for alternately energizing and de-energizing the vacuum motor.

DESCRIPTION OF DRAWINGS

Further objects, advantages and features of the present invention will appear from the following description, taken with the accompanying drawings, in which:

FIG. 1 is a perspective view of a push-push air conditioning switch combined with a rotary heat control for an air control system.

FIG. 2 is an exploded perspective view of the switch of FIG. 1.

FIG. 2A is an central longitudinal sectional view taken through the input shaft of the switch of FIG. 1.

FIG. 10 is a front elevational view of a subassembly for the switch, comprising the casing with electrical terminals and contacts installed therein, and with the switch contactor shown in its OFF position.

FIG. 11 is a fragmentary front elevational view similar to FIG. 10, but with the contactor removed.

FIG. 12 is a rear elevational view of a subassembly for the switch, comprising the cover, the carriage, the return spring for the carriage, the contactor on the carriage, and the spring latch in its initial position relative to the latching cam and other components of the latching mechanism for the switch.

FIG. 13 is a rear elevational view of the cover, showing the latching structure thereon.

FIG. 14 is a greatly enlarged fragmentary rear elevation corresponding to a portion of FIG. 13 and showing the latching cam and other latching structure on the cover.

FIG. 15 is a fragmentary section, taken generally along the line 15—15 in FIG. 14.

FIG. 16 is a fragmentary section, taken generally along the broken line 16—16 in FIG. 14.

FIG. 17 is a fragmentary section, taken along the broken line 17—17 in FIG. 14.

FIG. 20 is an exploded perspective view of a rotary electrical blower switch combined with a push-push recirculation control switch, to be described as components of a control apparatus constituting an illustrative embodiment of the present invention.

FIG. 21 is a side elevational view of the switch of FIG. 20.

FIG. 22 is a front elevational view of the switch of FIG. 20.

FIG. 23 is another side elevational view of the switch of FIG. 20, showing the opposite side, relative to the side shown in FIG. 21.

FIG. 24 is a rear elevational view of the switch of FIG. 20.

FIG. 35 is an enlarged longitudinal view showing the carriage of the recirculation control switch.

FIG. 36 is an enlarged end view showing the right-hand end of the carriage in its orientation of FIG. 35.

FIG. 37 is an enlarged sectional view taken through the recirculation switch carriage, generally along the line 37—37 in FIGS. 35 and 38.

FIG. 38 is an enlarged longitudinal view of the recirculation switch carriage, taken generally as indicated by the line 38—38 in FIG. 35.

FIG. 39 is an enlarged elevational view of a subassembly for the switch of FIG. 20, showing the terminal head, the electrical contacts for the push-push control switch, and the indicator lamp.

FIG. 40 is an enlarged elevational view of the subassembly shown in FIG. 39, taken generally as indicated by the line 40—40 therein.

FIG. 42 is a schematic electrical circuit diagram showing the electrical circuitry for the switch of FIG. 20.

FIG. 43 comprises electrical and vacuum function tables for the switch of FIG. 20.

FIG. 44 is an electrical terminal function table for the switch of FIG. 20.

FIG. 46 is an enlarged longitudinal view of the subassembly of FIG. 29, showing the side thereof opposite from the side shown in FIG. 29.

FIG. 47 is an enlarged elevational view of the spring latch employed in the subassembly of FIGS. 29 and 46.

FIG. 48 is an auxiliary view of the spring latch, taken as indicated by the line 48—48 in FIG. 47.

DETAILED DESCRIPTION OF ILLUSTRATIVE EMBODIMENTS

Figure 3:
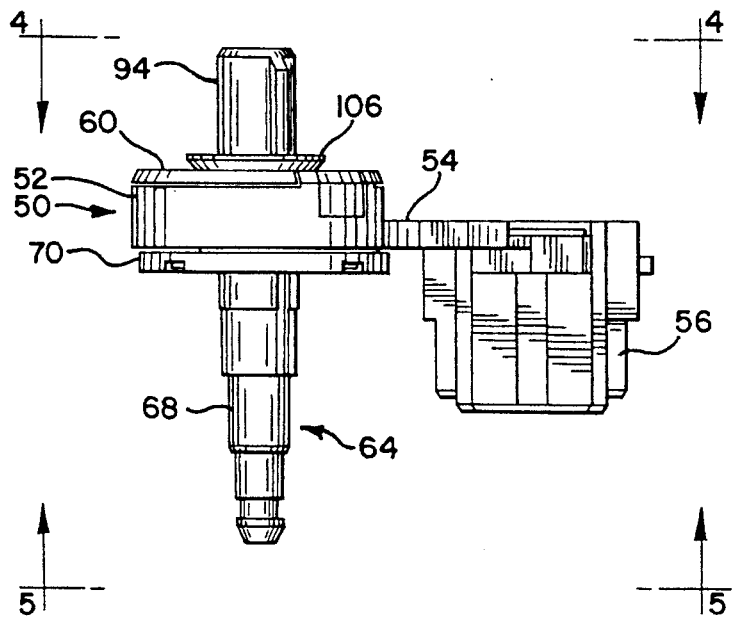
FIG. 3 is a plan view of the switch of FIG. 1.
Figure 4:
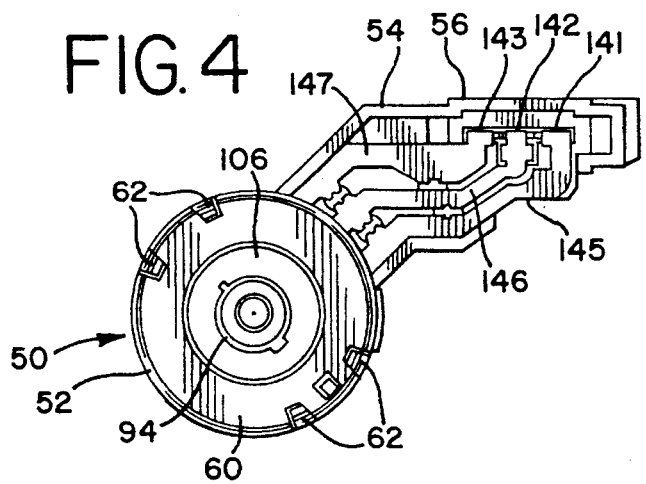
FIG. 4 is a front elevational view, taken as indicated by the line 4—4 in FIG. 3.
Figure 5:
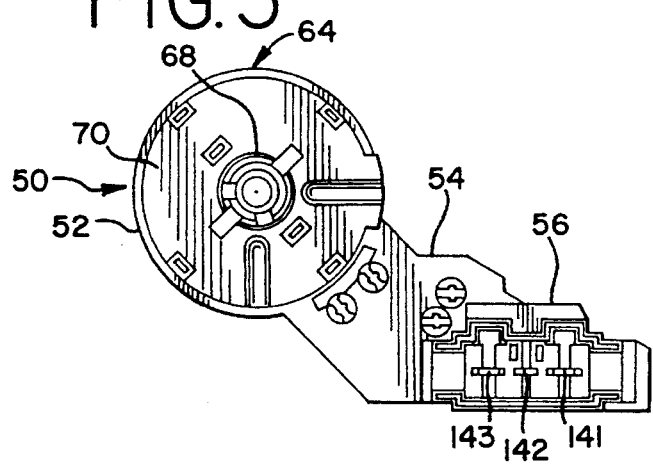
FIG. 5 is a rear elevational view, taken as indicated by the line 5—5 in FIG. 3.

As just indicated, FIGS. 1–5 show an air conditioning (A/C) switch 50 combined with a rotary heat control, for use particularly in an automotive heating, ventilating and air conditioning system. The illustrated switch 50 comprises a generally cylindrical casing 52, preferably made of a strong resinous plastic material, such as glass-filled nylon, for example. A channel-shaped arm 54 is molded in one piece with the casing 52 and is connected integrally with a terminal head 56. Electrical conductors 58 extend along the arm 54 from the casing 52 to the terminal head 56 and are formed integrally with terminals therein, to be described later herein.

As shown in FIGS. 1 and 2, a substantially circular front cover 60 is suitably secured to the casing 52 by resilient fingers 62 on the casing 52, for example.

The switch 50 comprises an output shaft 64 having front and rear portions 66 and 68, preferably molded in one piece from a suitable resinous plastic material, such as glass-filled nylon, for example. The output shaft 64 also has an outwardly projecting substantially circular disk portion 70 molded in one piece with the shaft 64. A coaxial hub or journal 72 is formed on the front portion 66 of the shaft 64 adjacent the front of the disk portion 70 and is adapted to be rotatably received in an axial circular opening 74 formed in a substantially circular rear wall 76 of the casing 52. The journal 72 is rotatably retained in the opening 74 by suitable means, illustrated as a split retainer ring 78 adapted to mate with a peripheral groove 80, formed in the front portion 66 of the output shaft 64 in front of the hub 72.

The front portion 66 of the output shaft 64 is hollow and is adapted to receive a miniature electrical indicator lamp 82 having its end leads connected electrically to substantially circular electrically conductive contact rings 84 and 86 mounted on the front side of the disk portion 70 of the shaft 64. The rear portion 68 of the output shaft 64 is adapted to be connected to a control device, such as a cam, not shown, which operates a heat control valve for an automotive heating, ventilating and air conditioning system. Thus, rotation of the shaft 64 varies the amount of heat supplied to the system.

The space between the casing 52 and the cover 60 is occupied by a subassembly comprising an insulating carriage 88 which is slidable crosswise between the casing 52 and the front cover 60, an electrical contactor 90 which is slidable with the carriage 88 and a spring latch 92, mounted on the carriage 88. The carriage 88 is preferably made of a suitable resinous plastic material such as acetal, for example. All of these components will be described in greater detail presently.

The front portion 66 of the output shaft 64 is adapted to be received in the rear end of a hollow input shaft 94 which projects forwardly on the switch 50 and is adapted to receive a suitable operating knob, not shown. The hollow input shaft 94 and the front portion 66 of the output shaft 64 are telescopically coupled together in such a manner that the output shaft 64 will always rotate with the input shaft 94. However, the coupling is such that the hollow input shaft 94 is slidable rearwardly and forwardly through a limited range relative to the front portion 66 of the output shaft 64. To achieve such coupling, the front shaft portion 66 is formed with a plurality of external longitudinal splines 96, adapted to mesh with mating internal splines 98 formed in the hollow input shaft 94. In order to retain the hollow input shaft 94 on the front portion 66 of the output shaft 64, the input shaft 94 is formed with a flexible pawl or catch 100 adapted to be received in a longitudinal groove 102 formed in the front portion 66 of the output shaft 64. When the hollow input shaft 94 is assembled on the front portion 66 of the output shaft 64, the hollow input shaft 94 is mated with the front portion 66 and then is pushed rearwardly thereon until the pawl 100 snaps into the longitudinal groove 102. The input shaft 94 is preferably molded of a suitable resinous plastic material such as glass-filled nylon, for example.

In order to provide resilient biasing means between the hollow input shaft 94 and the front portion 66 of the output shaft 64, a compression coil spring 104 is received within the hollow input shaft 94 and is compressed between the input shaft and the front portion 66 of the output shaft 64. The input shaft 94 is adapted to be pushed rearwardly relative to the front portion 66 of the output shaft 64. When the input shaft 94 is released, it is returned forwardly by the coil spring 104.

The rear portion of the hollow input shaft 94 is formed with a cam 106 which is generally frustoconical in shape. The cam 106 is movable freely in a circular opening 108 formed axially in the front cover 60. The conically tapering cam 106 is engageable with a spherical cam follower surface 110 formed on the carriage 88 at one end of a non-circular opening 112 therein; whereby rearward movement of the cam 106 is effective to produce crosswise movement of the carriage 88 against the biasing action of a return spring 114 which may take the form of a coil spring compressed between the carriage 88 and the front cover 60, as shown in FIG. 12.

FIGS. 10–13 illustrate additional details of the front cover 60, the insulating carriage 88, the electrical contactor 90 and the spring latch 92. In order to guide the carriage 88 for crosswise movement, the rear side of the front cover 60 is formed with diametrically opposite guide channels 116 and 118 for slidably receiving guide lugs 120 and 122 on the carriage 88. As shown in FIG. 12, the coil spring 114 is disposed in the channel 118 and is compressed between the cover 60 and the carriage 88, for resiliently biasing the carriage 88 and the contactor 90 to their OFF position.

To locate and retain the contactor 90 on the carriage 88, the contactor 90 is formed with oppositely projecting tabs 124 and 126 which are received and located in corresponding slots or notches 128 and 130 in the carriage 88. The contactor 90 is made of electrically conductive spring sheet metal, such as phosphor bronze, for example. The illustrated contactor 90 is formed with three contact points 131, 132 and 133 projecting rearwardly from the contactor 90.

Figure 18:
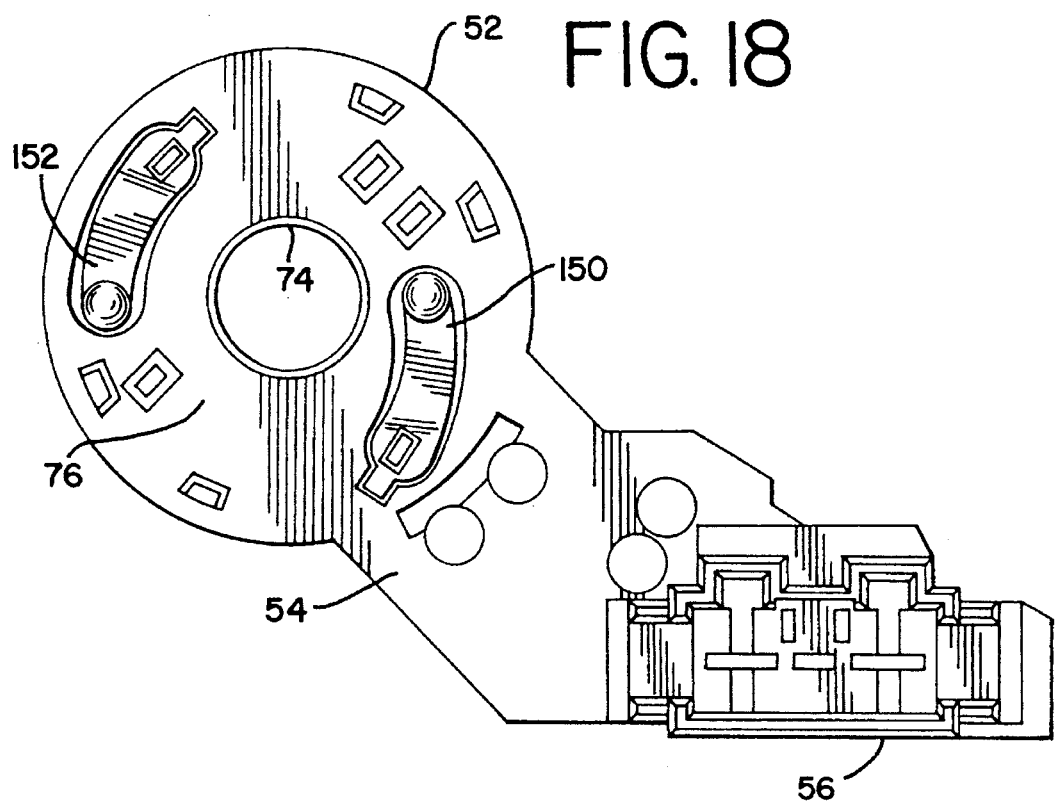
FIG. 18 is a rear elevational view of a subassembly comprising the casing with electrical contactors mounted thereon.

FIGS. 10 and 11 show the relation between the movable contactor 90 and the stationary contact structure in the casing 52. The contactor 90 is again shown in its OFF position. The contactor points 131 and 132 are out of engagement with electrically conductive stationary contacts 135 and 136, while the contact point 133 is in sliding engagement with a stationary contact 137. The terminal head 56 supports three electrically conductive terminals 141, 142 and 143 having respective conductor strip portions 145, 146 and 147 extending along the channel-shaped arm 54. Previously herein, the elements 145, 146 and 147 were referred to collectively as conductors 58. The stationary contacts 135 and 137 are formed in one piece with the strip portions 145 and 147 of the terminals 141 and 143. Means are provided to connect the electrical lamp 82 between the fixed contact 136 and the second strip portion 146. For this purpose, the fixed contact 136 and the second strip portion 146 are connected to electrically conductive spring contactors 150 and 152 mounted on the rear side of the casing 52, as shown in FIG. 18, and slidably engageable with the electrically conductive contact rings 84 and 86 to which the electrical leads of the lamp 82 are connected.

The switch 50 is operated from its OFF position to its ON position by pushing the input shaft 94 rearwardly against the biasing force of the spring 104. The conically shaped cam 106 engages the cam follower surface 110 on the carriage 88 and causes it to move crosswise or laterally against the resilient biasing force of the coil spring 114. The contactor 90 is moved with the carriage 88 so that the contact points 131 and 132 are moved into engagement with the stationary contacts 135 and 136. The contact point 133 remains in engagement with the stationary contact 137, so that all three stationary contacts 135, 136 and 137 are connected together electrically by the contactor 90.

When the input shaft 94 is released, it is returned forwardly to its original position by the spring 104. The biasing spring 114 tends to return the carriage 88 and the contactor 90 to their OFF position. However, the switch 50 is provided with a push-push latching mechanism 154 for latching the carriage 88 in its ON position. The latching mechanism 154 is constructed and arranged so that it is released by again pushing the input shaft 94 rearwardly whereby the conically shaped cam 106 produces a small lateral movement of the carriage 88. Such movement is effective to unlatch the mechanism 154 so that the carriage 88 and the contactor 90 are returned to their OFF position by the biasing spring 114 when the input shaft 94 is released whereupon it is returned forwardly by the spring 104.

The spring latch 92, shown in FIGS. 2 and 12, is one principal component of the latching mechanism 154. The spring latch 92 is a wireform member, made of suitable spring wire, such as piano wire, for example. The illustrated spring latch 92 comprises a flexible resilient spring arm 156 having its end portion bent transversely therefrom to form a latching prong 158 which extends generally in a forward direction, in this instance. The spring latch 92 has a first leg 160 bent at an angle of approximately ninety degrees from the spring arm 156 and a second leg 162 bent at an angle of approximately ninety degrees from the first leg 160 whereby the spring latch 92 is generally U-shaped, as viewed from the front in FIG. 12. The first leg 160 affords a torsion spring action so as to bias the spring arm 156 and the latching prong 158 forwardly, toward the front cover 60. The forward movement of the spring arm 156 is limited by an L-shaped stop or lug 164 on the carriage 88. An intermediate portion of the spring arm 156 is hooked behind the L-shaped lug 164 which also helps to retain the spring latch 92 on the carriage 88. The first leg 160 of the spring latch 92 extends in front of a second L-shaped lug 166 formed on the carriage 88 and located to engage the first leg 160 near the spring arm 156. The second leg 162 of the spring latch 92 extends behind a third generally L-shaped lug 168 and in front of a fourth generally L-shaped lug 170 on the carriage 88. The lugs 164, 166, 168 and 170 are effective to retain the spring latch 92 on the carriage 88.

The latching mechanism 154 also comprises latching cam means 172, adapted to be cooperatively engaged by the spring latch 92, the latching cam means being molded or otherwise provided on the front cover 60 in this instance, as shown in FIGS. 6–9 and 12–17. The illustrated latching cam means comprise a generally heart-shaped cam 174 projecting rearwardly from the cover 60 and having first, second and third lobes 176, 178 and 180 with a latch-receiving pocket 182 between the second and third lobes 178 and 180. The heart-shaped cam 174 is formed with a first cam surface 184 extending along and between the first and second lobes 176 and 178, a second cam surface 186 extending along and between the second cam lobe 178 and the latch-receiving pocket 182, a third cam surface extending along and between the pocket 182 and the third lobe 180, and a fourth cam surface 190 extending along and between the third lobe 180 and the first lobe 176.

The latching cam means 172 also comprise a first ramp member 192 adjacent but spaced from the first lobe 176 of the heart-shaped cam 174. A first space or channel 194 is provided between the first ramp member 192 and the first cam surface 184. The space 194 is sufficiently wide to accommodate the latching prong 158 on the spring arm 156 of the spring latch 92 with adequate clearance to provide for free movement of the latching prong 158 along the space 194.

Figure 6:
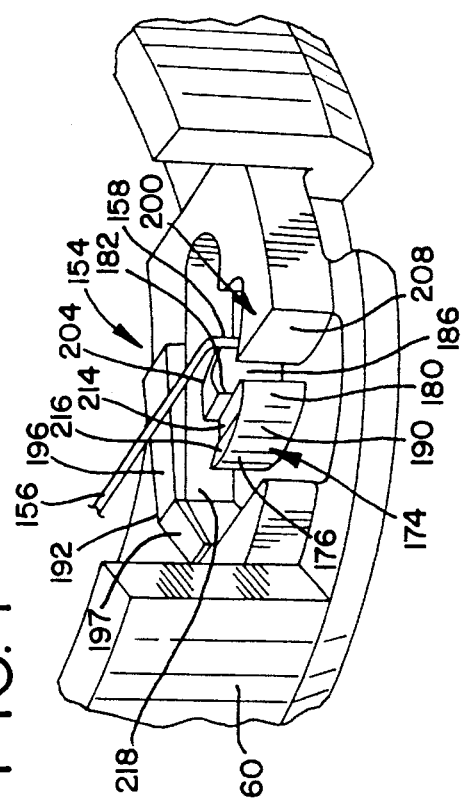
FIGS. 6–9 are greatly enlarged fragmentary perspective views illustrating four successive stages in the operation of the push-push latching mechanism employed in the switch of FIG. 1.
Figure 8:
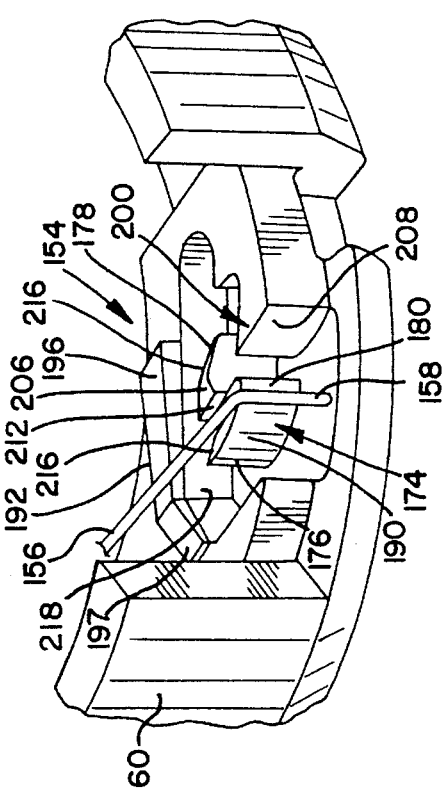
Figure 7:
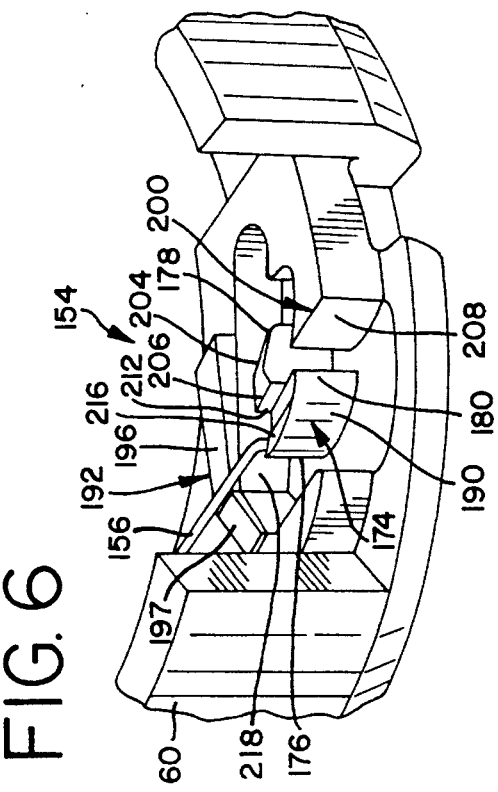
Figure 9:
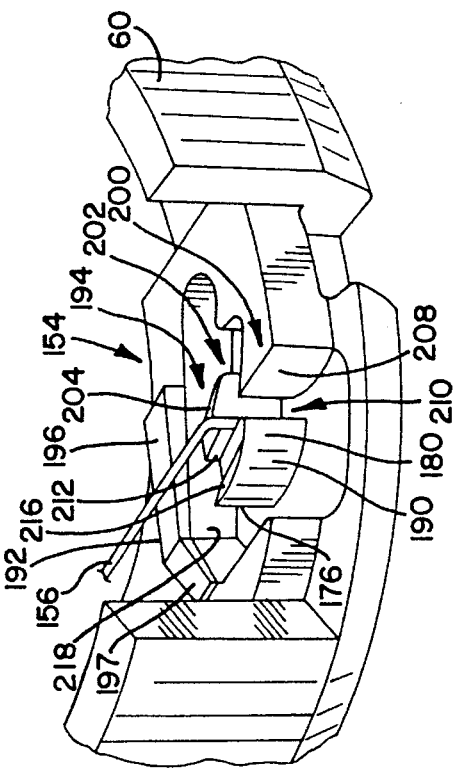

In its initial or home position, the latching prong 158 on the spring arm 156 of the spring latch 92 is positioned in the first space 194. The spring arm 156 is biased against a flat surface 197 of the first ramp member 192 by the resilient biasing action of the spring latch 92. This initial or home position is shown in FIGS. 6 and 12. When the input shaft 94 is pushed inwardly to operate the switch 50, the carriage 88 and the spring latch 92 are moved laterally so that the latching prong 158 is moved across the space 194 into engagement with the first cam surface 184. The latching prong 158 then travels along the first cam surface 184 extending along and between the first and second lobes 176 and 178 of the heart-shaped cam 174. At the same time, the spring arm 156 of the spring latch 192 engages a first ramp 196 on the first ramp member 192. The first ramp 196 is inclined in a rearward direction such as to cause rearward movement of the spring arm 156 and the latching prong 158. The resilience of the spring latch 92 continues to bias the spring arm 156 and the latching prong 158 forwardly until the latching prong 158 escapes abruptly from the second cam lobe 178 and snaps abruptly against a first guide surface 198 of a generally V-shaped guide member 200 projecting partially into the latch-receiving pocket 182 of the heart-shaped cam 174. The impact of the latching prong 158 against the first guide surface 198 produces a definitely audible click. The impetus for the movement of the latching prong 158 is provided by the resilient biasing action of the spring latch 92. The first guide surface 198 is separated from the second cam surface 186 by a second space or channel 202 which is sufficiently wide to provide for free movement of the latching prong 158 along the space 202. The V-shaped guide member 200 is molded or otherwise provided on the cover 60.

When the input shaft 94 is released after its first pushing movement, the shaft 94 is returned immediately to its initial position by the spring 104. However, the carriage 88 is only partially returned by the spring 114, due to the latching action of the latching mechanism 154. The partial return movement of the carriage 88 produces partial return movement of the spring latch 92, during which the latching prong 158 travels along the first guide surface 198 and the second space or channel 202. The spring arm 156 encounters a second ramp 204 formed on the second cam lobe 178 and sloping in a direction opposite from the slope of the first ramp 196. The second ramp 204 slopes to a crest 206 on the second cam lobe 178.

The movement of the latching prong 158 along the first guide surface 198 is continued until the latching prong 158 escapes abruptly from the first guide surface 198, whereupon the latching prong 158 snaps abruptly into and against the latch-receiving pocket 182 on the heart-shaped cam 174 to produce a second distinctly audible click. At this point, the latching prong 158 is in its fully latched position. The electrical contactor 90 is still in its ON position.

The V-shaped guide member 200 has a second guide surface 208 which is separated from the third cam surface 188 by a third space or channel 210 which is sufficiently wide to receive the latching prong 158 for free sliding movement.

When the switch 50 is to be operated to its OFF position, the input shaft 94 is pushed rearwardly for a second time so as to cause full lateral movement of the carriage 88 and the spring latch 92. The latching prong 158 travels along the third cam surface 188 and the third space or channel 210 until the latching prong 158 escapes from the third cam surface 188 and engages the fourth cam surface 190. Simultaneously with the movement of the latching prong 158, the spring arm 156 of the spring latch 92 rides along the crest 206 until it encounters an abrupt dropoff 212 extending between the crest 206 and a valley 214 extending from the pocket 182 along the first lobe 176 of the cam 174. The impact of the spring arm 156 with the valley 214 produces a third distinctly audible click. The impetus for the abrupt movement of the spring arm 156 from the crest 206 to the valley 214 is provided by the resilient biasing action of the spring latch 92. The third audible click is produced as the second pushing movement of the input shaft 94 is completed.

When the input shaft 94 is released, it is returned forwardly to its initial position by the return spring 104. At the same time, the spring 114 returns the carriage 88 and the contactor 90 to their OFF position, as shown in FIG. 12. During the return movement, the latching prong 158 of the spring latch 92 travels along the fourth cam surface 190 which extends along and between the third cam lobe 180 and the first cam lobe 176. At the same time, the spring arm 156 of the spring latch 92 encounters a third ramp 216 which is formed on the first cam lobe 176 and slopes rearwardly from the valley 214, generally in the same direction as the slope of the second ramp 204. The spring arm 156 moves along and is displaced rearwardly by the third ramp 216 until the latching prong 158 escapes abruptly from the first cam lobe 176, and the arm 156 snaps abruptly against the flat surface 197 of the ramp member 192 to produce a fourth distinctly audible click. At this point, the latching prong 158 and the spring arm 156 have returned to their original or home position, as shown in FIGS. 6 and 12. The first cam surface 184 and a side surface 218 on the ramp member 192 provide opposite walls of the first space 194.

Figure 19:
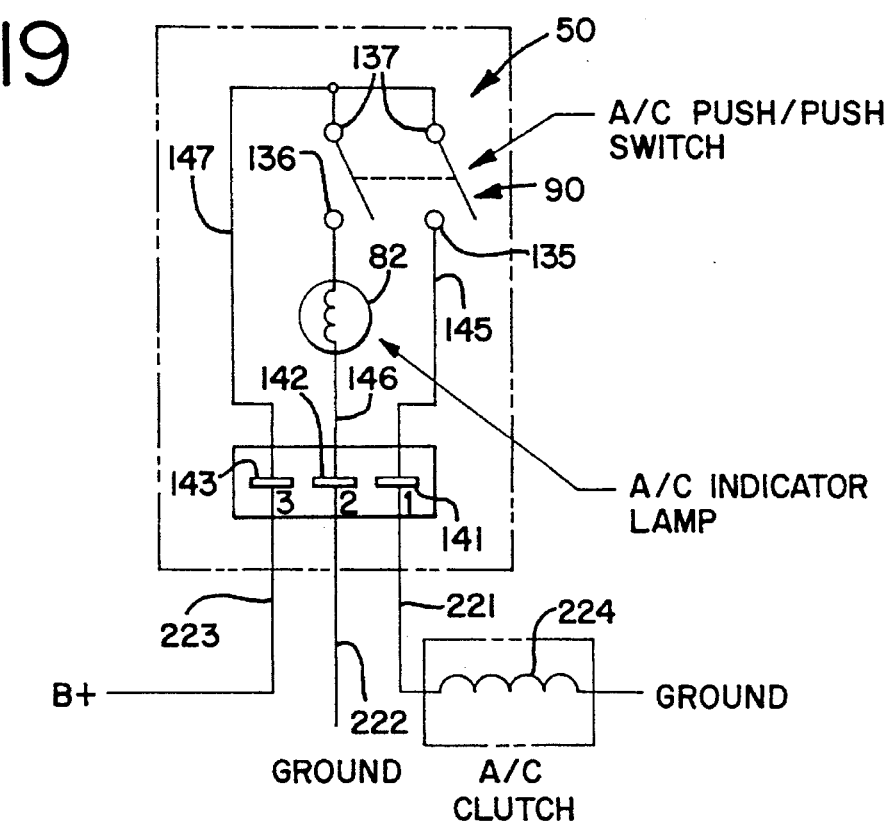
FIG. 19 is a schematic electrical circuit diagram showing the electrical circuitry of the air conditioning switch of FIG. 1.

FIG. 19 is a schematic electrical circuit diagram showing the manner in which the push-push air conditioning switch 50 may be connected into an automotive heating, ventilating and air conditioning system. The switch 50 is shown in its OFF position in which the electrical contactor 90 engages the fixed contact 137 but is out of engagement with the fixed contacts 135 and 136. The terminals 141, 142 and 143 are adapted to receive an electrical connector whereby the terminals are connected to external leads or wires. For simplicity, however, the connector is not shown in FIG. 19. Instead, FIG. 19 shows external leads or wires 221, 222 and 223 connected directly to the respective terminals 141, 142 and 143. The lead 223 is connected between the terminal 143 and the positive battery terminal designated B+ in FIG. 19. The lead 222 is connected between the terminal 142 and GROUND, to which the negative battery terminal is also connected. The metal frame of the vehicle ordinarily serves as GROUND. The lead 221 is connected to one end of the electrical operating solenoid 224 of the A/C clutch, while the other end of the solenoid 224 is connected to GROUND.

When the electrical contactor 90 is moved to its ON position, the contactor 90 connects all three fixed contacts 135, 136 and 137 together, so that the clutch solenoid 224 is energized by electrical current which flows from the positive battery terminal B+ along a conductive path comprising the lead 223, the terminal 143, the conductor 147, the fixed contact 137, the contactor 90, the fixed contact 135, the conductor 145, the terminal 141 and the lead 221. The indicator lamp 82 is energized by current flowing from the battery terminal B+ along a conductive path comprising the lead 223, the terminal 143, the conductor 147, the stationary contact 137, the contactor 90, the fixed contact 136, the lamp 82, the conductor 146, the terminal 142, and the lead 222 connected to GROUND.

FIGS. 20–24 show components of an illustrative embodiment of the present invention, comprising a rotary blower switch 230, combined with a push-push latching vacuum-electric recirculation control switch 232. Both switches 230 and 232 are operable by a hollow input shaft 234, which projects forwardly from a generally cylindrical blower switch casing 236. The shaft 234 may be made of glass-filled nylon or some other suitable resinous plastic material. The shaft 234 is rotatable relative to the casing 236 to operate the blower switch 230, and is also adapted to be pushed rearwardly through a limited range into the casing 236 to operate the push-push vacuum-electric switch 232. The input shaft 234 is resiliently biased outwardly, in a manner to be described presently, so that the shaft 234 returns forwardly to its initial position after being pushed and released. The shaft 234 is adapted to receive a suitable operating knob, not shown.

As shown generally in FIG. 20, the input shaft 234 is rotatably and slidably coupled to a hollow, generally cylindrical output shaft or carriage 238 which is rotatable through a limited range in the rear portion of the blower switch casing 236. The input shaft 234 and the carriage 238 are telescopically assembled in such a manner that the carriage 238 always rotates with the shaft 234. However, the input shaft 234 is slidable rearwardly relative to the carriage 238 through a limited range and is resiliently biased forwardly by spring means, illustrated in FIG. 41 as a coil spring 240 which is compressed between the input shaft 234 and the carriage 238. The carriage 238 may be made of glass-filled nylon or some other suitable resinous plastic material.

As shown in FIG. 20, the carriage 238 has an enlarged rear end portion 242 which is adapted to carry a plate-like rotary contactor 244 which is selectively engageable with a plurality of fixed electrical contacts, to be described presently, mounted on a front portion 246 of a terminal head 248, made of an electrically insulating material, such as glass-filled nylon or some other suitable resinous plastic material. The contactor 244 is made of an electrically conductive material, such as copper, for example. The contactor 244 is guided for rearward and forward movement relative to the rear end portion 242 of the carriage 238 by a plurality of guide prongs 250 bent forwardly from the plate-like contactor 244 and slidable through slotted projections 252 on the rear end portion 242 of the carriage 238. The contactor 244 is resiliently biased rearwardly relative to the carriage 238 by a plurality of springs 254, illustrated as coil springs compressed between the contactor 244 and the rear end portion 242 of the carriage 238. Three of the coil springs 254 are provided in the present instance.

The rear end portion of the carriage 238 is rotatably supported and guided by a hollow axial post 256 formed in one piece on the terminal head 248 and extending into the hollow carriage 238 through an opening 258 in the contactor 244.

The vacuum-electric switch 232 comprises a generally rectangular housing 260 which is generally channel-shaped and is adapted to be received and mounted in a generally channel-shaped member 262 projecting laterally on the casing 236 and extending longitudinally therealong. A vacuum-electric switch carriage 264 is slidably received in the housing 260 and is movable longitudinally to perform electrical and vacuum switching functions. The carriage 264 is resiliently biased to an initial or home position by spring means, illustrated in FIG. 20 as a coil spring 266, compressed between the carriage 264 and a spring nest 268 formed in one piece with the housing 260. The housing 260 and the carriage 264 may be made of suitable resinous plastic materials, such as glass-filled nylon, for example.

An electrical contactor 270 is mounted on the carriage 264 and is slidable along fixed electrical contacts in the form of contact plates 272 and 274 mounted on the terminal head 248 and projecting forwardly therefrom. The contactor 270 and the contact plates 272 and 274 are made of a suitable electrically conductive material, such as copper, for example. When the carriage 264 is in its initial or home position, as shown in FIG. 20, the contactor 270 does not form a bridge between the contact plates 272 and 274. When the carriage 264 is moved rearwardly against the biasing action of the spring 266, the contactor 270 is moved into bridging contact with both contact plates 272 and 274, so that the electrical circuit therebetween is closed. Further details of the contactor 270 and the contact plates 272 and 274 will be described presently.

Figure 41:
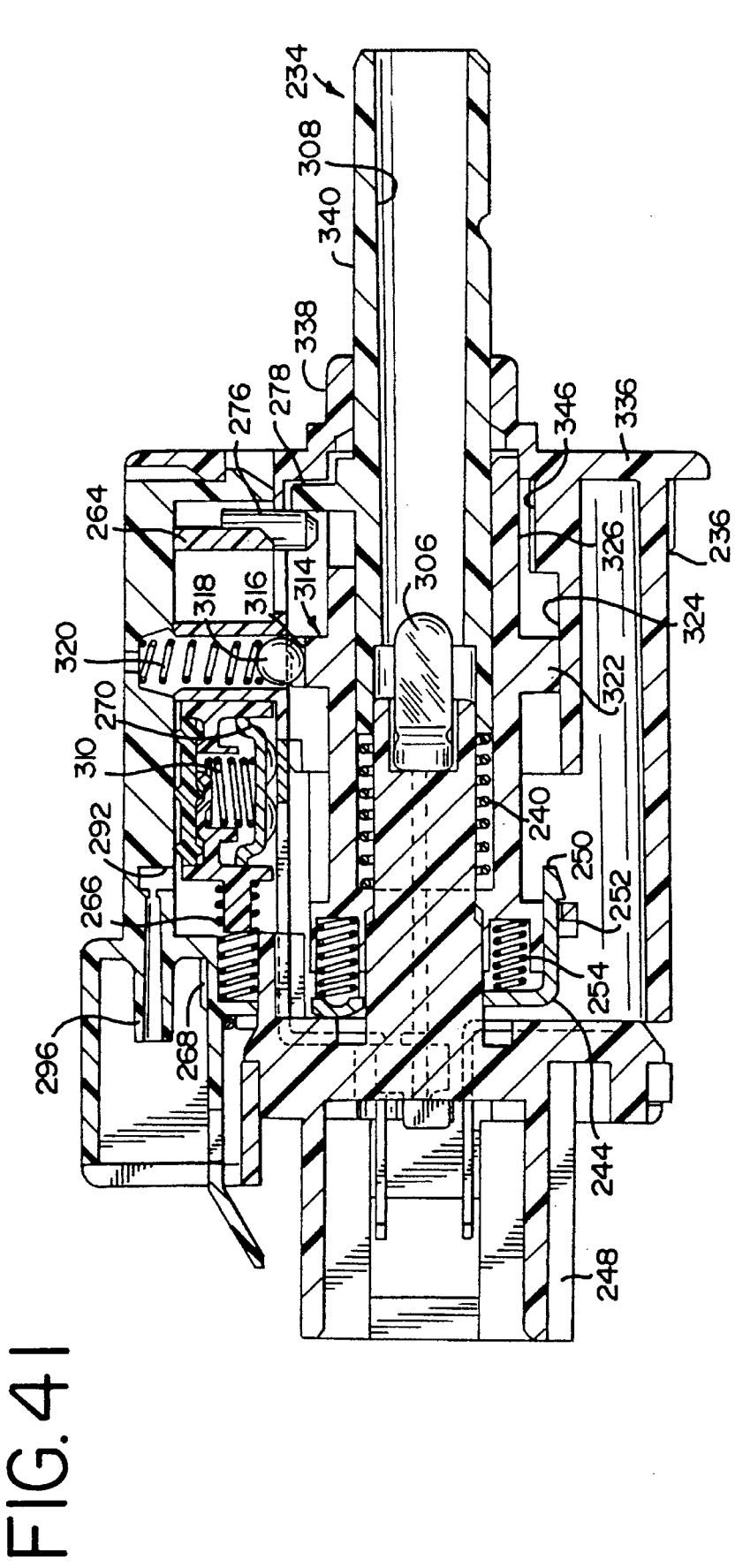
FIG. 41 is an enlarged longitudinal sectional view taken through the blower switch of FIG. 20, generally along the line 41—41 in FIG. 22, the associated push-push vacuum-electric recirculation switch being shown in its initial unactuated position.

The input shaft 234 and the switch carriage 264 are provided with cooperative means whereby the carriage 264 is moved rearwardly by rearward movement of the shaft 234. On the carriage 264, such means take the form of a pin 276 formed in one piece with the carriage 264 and projecting into the generally cylindrical casing 236. The pin 276 is engageable and operable by a sector-shaped flange 278 formed in one piece with the input shaft 234 and extending in a plane substantially perpendicular to the axis of the shaft 234. Throughout the limited range of rotary movement of the shaft 234, the flange 278 is engageable with the pin 276 when the shaft 236 is moved rearwardly, so that the switch carriage 264 is pushed rearwardly with the shaft 234, against the biasing action of the spring 266, which returns the switch carriage 264 forwardly when the shaft 234 is returned forwardly by its biasing spring 240 (FIG. 41).

Figure 33:
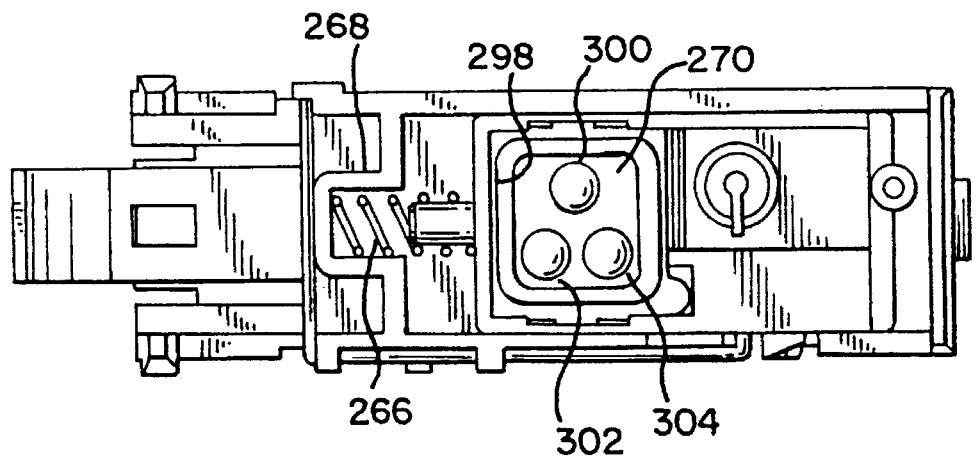
FIG. 33 is an enlarged longitudinal view of a subassembly comprising the recirculation control housing, the carriage, the electrical contactor and the spring latch.
Figure 34:
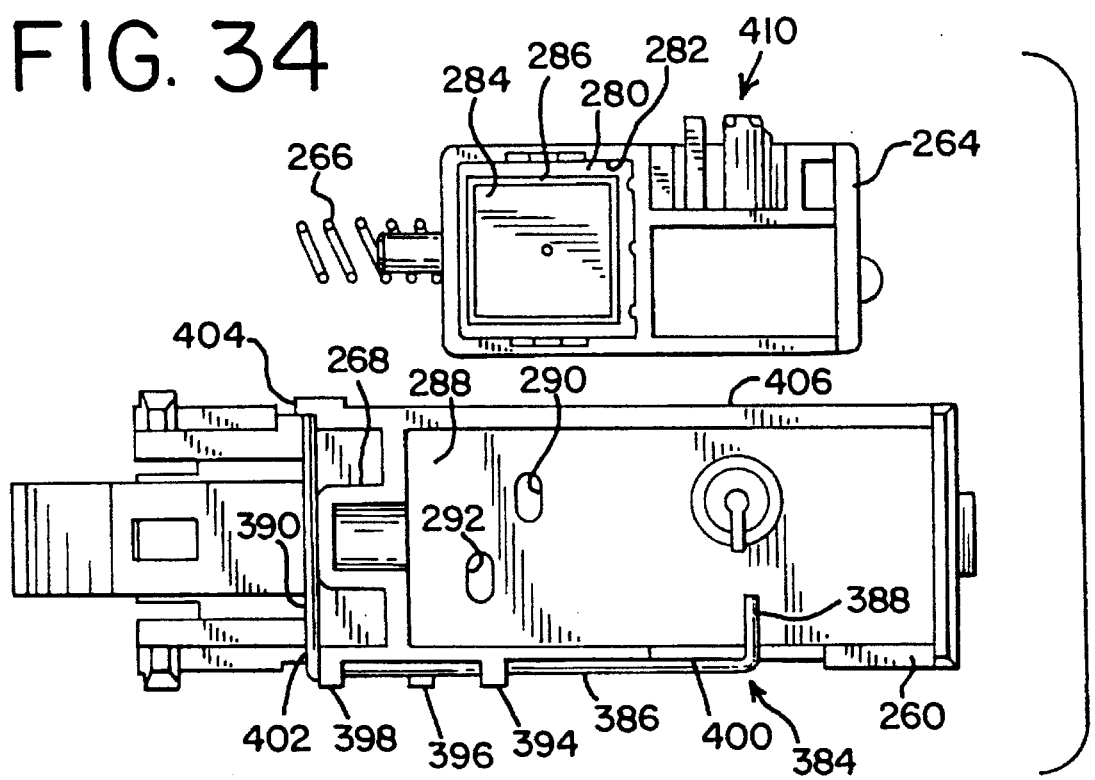
FIG. 34 is a view similar to FIG. 33, but showing the carriage removed and turned over to show the vacuum valve mounted in the carriage, while also showing the vacuum switch ports in the housing.

As shown in FIGS. 33 and 34, a soft resilient vacuum valve member or plate 280 is mounted in a recess 282 formed in the opposite side of the vacuum-electric carriage 264, relative to the side thereof in which the electrical contactor 270 is mounted. The valve member 280 is made of silicone rubber or some other suitable rubber or rubberlike material. As shown in FIG. 34, the valve member 280 has a flat outer surface 284 bounded by an outwardly projecting ridge 286 which is slidable along a flat valve surface 288 formed in the housing 260. The valve surface 288 is penetrated by staggered vacuum valve ports 290 and 292 which are formed in the housing 260 and which communicate with respective terminal nipples 294 and 296 or the like, projecting rearwardly on the housing 260, as shown in FIG. 24. The nipples 294 and 296 are adapted to receive a standard vacuum connector, not shown. The nipple 294 is connected to a vacuum source 293 (FIG. 45), while the nipple 296 is connected to a vacuum operator, motor or other device 295, operable by vacuum.

Figure 45:
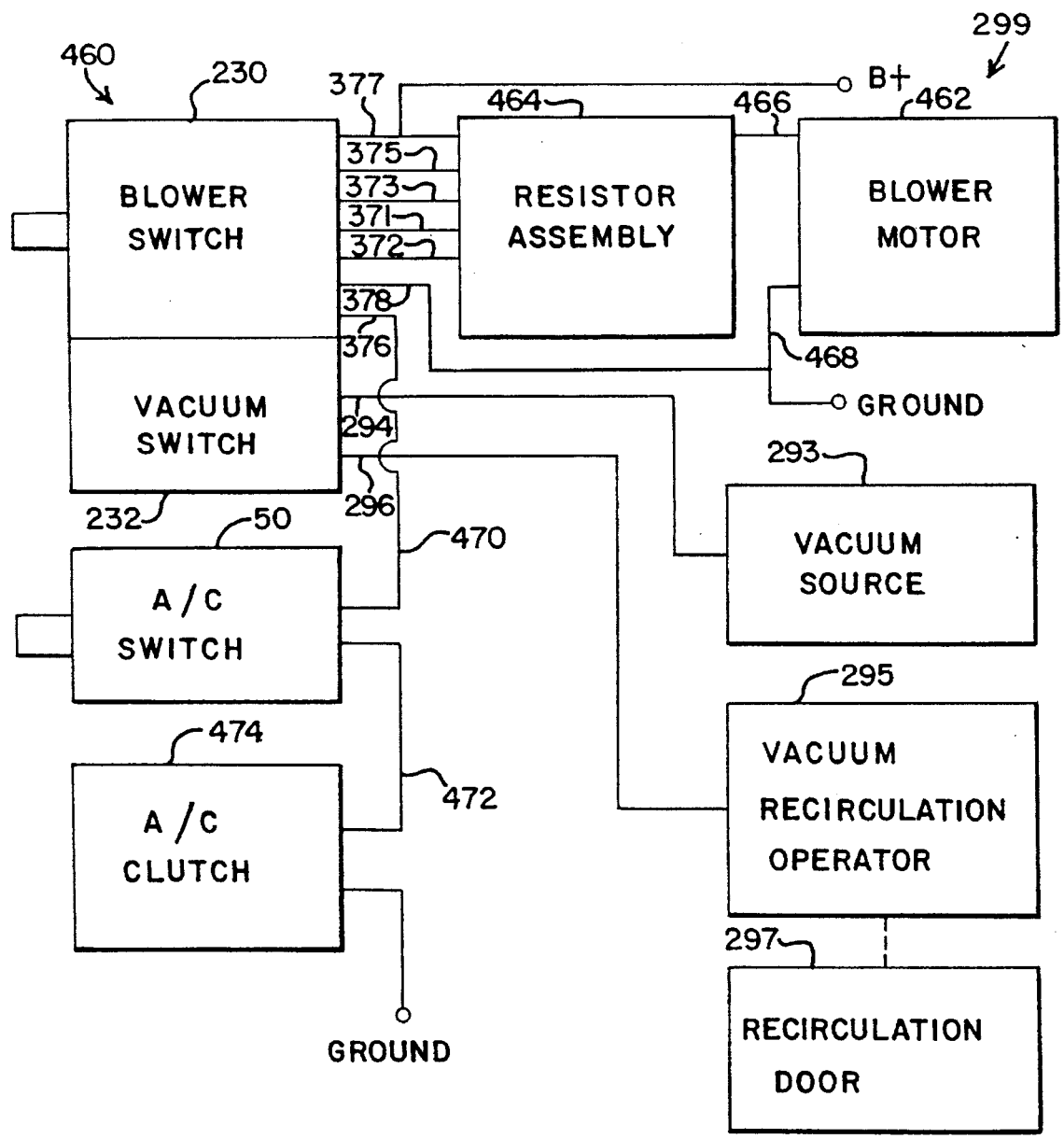
FIG. 45 is a schematic block diagram showing the switches of FIGS. 1 and 20 incorporated into the illustrative control apparatus for the air control system including heating, ventilating and air conditioning (A/C) components for an automotive vehicle.

In an advantageous control apparatus or system 460 utilizing the vacuum-electric switch 232, as shown diagrammatically in FIG. 45, the nipple 296 is connected to the vacuum operator or motor 295 for operating a movable recirculation door or valve member 297, adapted to shut off most or all of the outside air and to cause air to recirculate in an automotive heating, ventilating and air conditioning system 299. In view of this function, the vacuum-electric switch 232 may be referred to as a recirculation switch.

As shown in FIG. 33, the electrical contactor 270 is received and retained in a recess 298 which has a back-to-back relationship with the valve recess 282 in the carriage 264. The contactor 270 is formed with three outwardly projecting contact points 300, 302 and 304 which may have a generally spherical curvature. The contact points 302 and 304 are continuously in sliding engagement with the fixed contact plate 274, throughout the range of movement of the carriage 264. The contact point 300 initially engages the fixed contact plate 274, when the carriage 264 is in its initial forwardly-biased position, as shown in FIG. 20. When the carriage 264 is pushed rearwardly by the rearward movement of the input shaft 234, the contact point 300 slides into engagement with the fixed contact plate 272, so that a closed circuit is made between the plates 272 and 274. In this case, the closure of the circuit between the plates 272 and 274 is employed to energize a miniature indicator lamp 306 which is mounted within the hollow post 256, as shown in FIG. 41, and is visible through an axial opening 308 in the hollow input shaft 234. The closure of the electrical circuit can be employed to control a variety of external devices, if desired.

As shown in FIG. 41, the electrical contactor 270 is biased outwardly against the fixed contact plates 272 and 274 by resilient means, illustrated as a coil spring 310, compressed between the contactor 270 and the carriage 264.

As shown in FIG. 20, the casing 236 of the switch 230 is formed with a pair of flexible resilient arms or latches 312 for retaining the switch 230 in an opening in a mounting panel or the like, not shown.

Detent means are provided for detaining the rotatable carriage 238 in a plurality of switching positions, such detent means being illustrated as comprising a detent sector 314 formed in one piece with the carriage 238 and provided with a plurality of equally spaced detent notches 316. The detent sector 314 is engaged by a detent ball 318 which is resiliently biased against the detent sector 314 by a coil spring 320, compressed between the detent ball 318 and the housing 260 of the vacuum-electric switch 232.

Diametrically opposite from the detent notches 316, the carriage 238 is formed with a smooth, cylindrically curved flange 322 which is a continuation of the detent sector 314 and is slidably engaged with an internal cylindrical barrel 324, formed within the casing 236, as shown in FIG. 41. The sliding engagement between the flange 322 and the barrel 324 prevents bending or displacement of the carriage 238 by the force exerted by the biasing spring 320 for the detent ball 318.

As already indicated, the input shaft 234 is telescopically received in the carriage 238. The input shaft 234 and the carriage 238 are coupled together so that the carriage 238 always rotates with the shaft 234. As shown in FIG. 20, the means whereby such coupling is achieved comprise a spline 326 formed on the right-hand end of the carriage 238. When the shaft 234 and the carriage 238 are fully assembled, the spline 326 is slidably received between a pair of radial surfaces 328 and 330 formed on the opposite ends of the sector-shaped flange 278 on the shaft 234. The right-hand end of the carriage 238 is formed with a pair of additional splines 332 which are slidably received in a pair of arcuate slots 334 formed in the flange 278 on the input shaft 234.

As shown in FIG. 41, the switch casing 236 has a front wall 336 formed with an axial bearing portion 338 in which a front portion 340 of the input shaft 234 is rotatably and slidably received. The angular range of rotation of the shaft 234 is limited by stop means, illustrated as comprising a pair of generally radial stop surfaces 342 and 344 (FIG. 20) which are formed on the opposite ends of the flange 278 and are engageable with a narrow longitudinal stop ridge 346 (FIG. 41) projecting inwardly on the internal cylindrical barrel 324, adjacent the front wall 336 of the casing 236.

As previously indicated, the rotary contactor 244 of the blower switch 230 is selectively engageable with fixed contact means on the terminal head 248. As shown in FIGS. 20 and 40, the contactor 244 is formed with first, second and third contact points 348, 350 and 352 which project rearwardly and are engageable with the fixed contact means. In FIG. 40, the contactor 244 and the contact points 348, 350 and 352 are shown in phantom and, hence, are represented in broken lines. The first contact point 348 is slidably engaged with a first fixed arcuate contact sector 354 throughout the angular range of rotation of the contactor 244. The second contact point 350 of the contactor 244 is slidably engageable with a second fixed arcuate contact sector 356 throughout most of the angular range of rotation of the contactor 244, but the second contact point 350 is slidable into engagement with an insulating pad or boss 358, adjacent the counterclockwise end of the second contact sector 356. The insulating pad or boss 358 is formed in one piece with the terminal head 248 and is effective to define an OFF position of the contactor 244, at the counterclockwise end of its range of angular movement. The first and second arcuate contact sectors 354 and 356 are mounted on the terminal head 248 and are made of an electrically conductive material, such as copper, for example.

At the counterclockwise end of the angular range of rotation of the contactor 244, the third contact point 352 is slidably engageable with a second electrically insulating pad or boss 360, formed in one piece with the terminal head 248. When the contactor 244 is rotated clockwise from the OFF position defined by the first and second insulating pads 358 and 360, the third contact pint is movable successively into sliding engagement with first, second, third and fourth fixed contacts 362, 364, 366 and 368, mounted on the terminal head 248 and made of an electrically conductive material, such as copper, for example.

As shown in FIG. 24, which is a rear view of the switch 230, the terminal head 248 is fitted with eight terminals which are identified by the numerals 1 through 8 and also by the reference characters 371 through 378. It will be seen that the terminals 371–378 are in the form of rearwardly projecting lugs or prongs, adapted to receive a standard electrical connector, not shown.

With two exceptions, each of the terminals 371–378 is formed in one piece with one or another of the fixed contact sectors and the fixed contacts, in accordance with the following TABLE 1:

TABLE 1

| TERMINAL | CONNECTED TO |
| --- | --- |
| 371 (1) | Contact 364 |
| 372 (2) | Contact 362 |
| 373 (3) | Contact 366 |
| 374 (4) | Lamp contact plate 274 |
| 375 (5) | Contact 368 |
| 376 (6) | Contact sector 354 |
| 377 (7) | Contact sector 356 and lamp contact plate 272 |
| 378 (8) | Ground Lead of Lamp 306 |

It should be noted that the first lamp switching contact plate 272 is formed in one piece with the seventh terminal 377 and also the second contact sector 356. The leads of the lamp 306 are connected to the second lamp switching contact plate 274 and the eighth terminal 378 which is connected to ground by the external wiring. The second lamp switching contact plate 274 is formed in one piece with the fourth terminal 374, to which no external connection is made.

FIG. 42 is a schematic electrical circuit diagram of the combined blower switch 230 and the push-push vacuum electric switch 232. FIG. 42 shows the same connections which are represented in TABLE 1. It will be noted that the sixth terminal 376 is adapted to be connected to an external lead or wire 380, extending to the A/C (AIR CONDITIONING) SWITCH 50 shown in FIG. 1–19.

The push-push latching vacuum-electric switch 232 is provided with a latching mechanism 382 which is similar to the latching mechanism 154 for the push-push A/C switch 50. The latching mechanism 382 is shown to best advantage in the perspective view of FIGS. 25–28 and in the longitudinal views of FIGS. 29–32. The latching mechanism 382 is effective to latch the switch carriage 264 in its actuated position, when the input shaft 234 is pushed rearwardly and then released. The latching mechanism 382 is effective to release the carriage 264 for return movement by the spring 266 to the initial or unactuated position of the carriage 264 when the input shaft 234 is pushed rearwardly for a second time and is again released.

The latching mechanism 382 comprises a spring latch or latching spring 384 which is mounted in this instance on the stationary switch housing 260, as shown in FIGS. 33 and 34. The spring latch 384 is made of spring wire, such as piano wire, for example, and is formed with a flexible spring arm 386 having an end portion bent laterally to provide a latching prong 388. A first leg 390 is bent laterally from the opposite end portion of the spring arm 386 to afford support for the spring arm 386. A second leg 392 is bent from the opposite end of the first leg 390 to function generally as a retaining leg, extending in a direction transverse to the direction of the spring arm 386.

As shown in FIGS. 33 and 34, the spring arm 386 is hooked under a first lug 394, over a second lug 396 and under a third lug 398, all of which project laterally from a longitudinal wall 400 of the switch housing 260. The third lug 398 engages the spring arm 386 adjacent the elbow or bend between the spring arm 386 and the first leg 390, which is seated in a notch 402 formed in the wall 400 adjacent the third lug 398.

The first leg 390 of the spring latch 384 extends across the housing 260 and is hooked under a fourth lug 404 projecting from a second longitudinal wall 406 extending generally parallel with the first longitudinal wall 400 on the housing 260. As shown in FIG. 46, the second or retaining leg 392 of the spring latch 384 extends downwardly in a recess 408 formed in the second longitudinal wall 406.

The spring arm 386 and the latching prong 388 are adapted to cooperate with latching cam means 410 formed on the switch carriage 264 and comprising a heart-shaped cam 412 and a first ramp member 414 spaced therefrom, as shown to best advantage in FIGS. 25–28. The heart-shaped cam 412 comprises a first lobe 416, a second lobe 418 and a third lobe 420. A latch-receiving pocket 422 is formed on the cam 412 between the second and third lobes 418 and 420. The heart-shaped cam 412 is formed with a first cam surface 424 extending along and between the first and second lobes 416 and 418; a second surface 426 extending along and between the second lobe 418 and the latch-receiving pocket 422; a third cam surface 428 extending along and between the pocket 422 and the third lobe 420; and a fourth cam surface 430 extending along and between the third lobe 420 and the first lobe 416.

Figure 25:
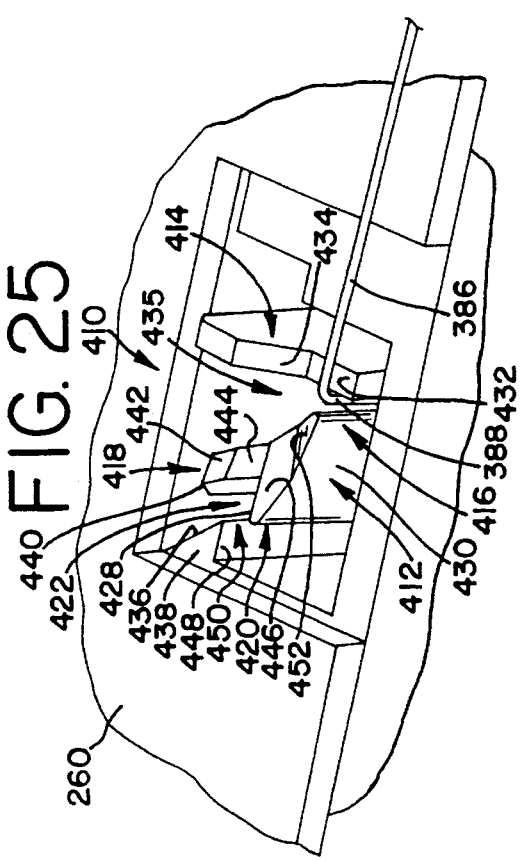

FIG. 25 shows the switch carriage 264 in its initial or retracted position relative to the housing 260. Likewise, the heart-shaped cam 412 is in its initial or home position relative to the spring latch 384. The spring arm 386 of the spring latch 384 is engaging a flat surface 432 on the first ramp member 414. A first ramp 434 slopes upwardly from the flat surface 432 on the ramp member 414. The latching prong 388 is positioned in a space or channel 435 between the first ramp member 414 and the first lobe 416 of the heart-shaped cam 412.

Figure 26:
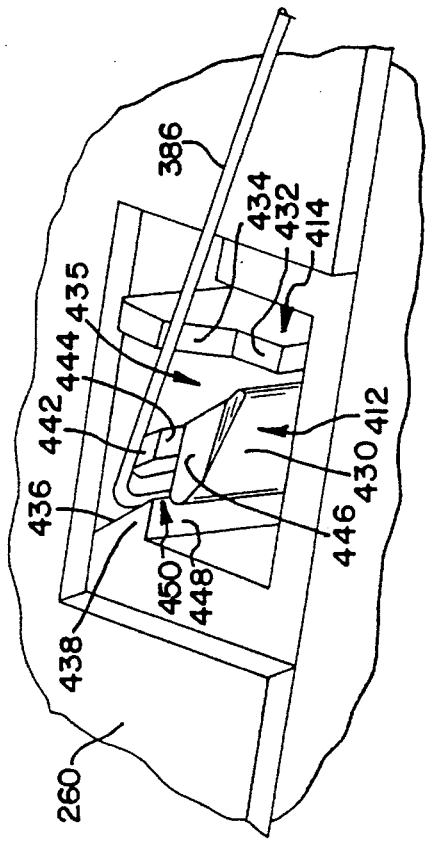

When the switch carriage 264 is pushed rearwardly toward its actuated position, the first cam surface 424 of the cam 412 engages the latching prong 388 and deflects it in a clockwise direction so that the spring arm 386 is caused to slide along the flat surface 432 and up the first ramp 434 on the ramp member 414. As the carriage 264 approaches its fully actuated position, it escapes abruptly around the second lobe 418 of the cam 412 and impacts or snaps abruptly against a first guide surface 436 on a generally V-shaped guide member 438 which projects partially into the latch-receiving pocket 422 in the heart-shaped cam 412, as shown in FIG. 26. The impact of the latching prong 388 produces an audible click to indicate that the first stage of the latching operation has been completed.

Figure 27:
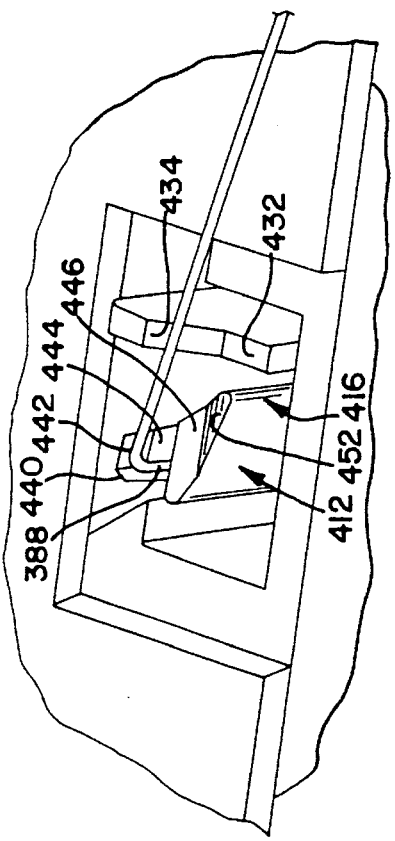
FIGS. 25–28 are greatly enlarged fragmentary perspective views showing four successive stages in the operation of the push-push latching mechanism employed in the recirculation control switch constituting a component of the switch of FIG. 20.

When the input shaft 234 is released after the first push thereon, the switch carriage 264 is returned partially in a forward direction by the biasing action of the return spring 266. The latching prong 388 moves along the first guide surface 436 and escapes abruptly from the V-shaped guide member 438, whereupon the latching prong 388 impacts or snaps abruptly into engagement with the latch-receiving pocket 422 to produce a second audible click, indicating that the second stage of the latching operation has been completed and that the carriage 264 is fully latched as shown in FIG. 27. As the heart-shaped cam 412 is moved between the successive positions of FIGS. 26 and 27, the spring arm 386 is engaged and deflected upwardly by a second ramp or chamfer 440 on the second lobe 418 of the cam 412. The spring arm 386 is positioned on a flat crest 442 of the second ramp or chamfer 440. The crest 442 terminates in an abrupt drop-off 444 extending down to a valley 446, formed on the cam 412 adjacent the latch-receiving pocket 422.

Figure 28:
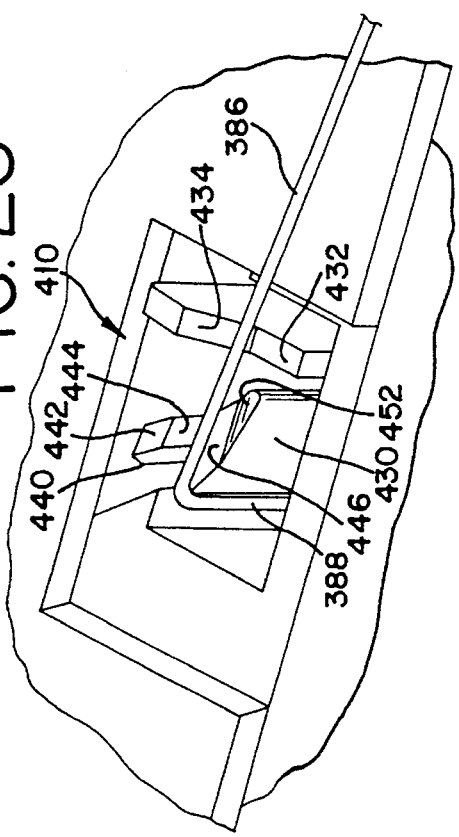

The V-shaped guide member 438 has a second guide surface 448 which is separated from the third cam surface 428 by a space or channel 450 which is sufficiently wide to receive the latching prong 388 for free sliding movement. When the vacuum-electric switch 232 is to be operated to its OFF or initial position, the input shaft 234 is pushed rearwardly for a second time so as to cause full rearward movement of the switch carriage 264 and the latching cam means 410 thereon. The third cam surface 428 travels rearwardly relative to the latching prong 388, and the second guide surface 448 also travels past the latching prong 388, which is slidably received in the space or channel 450. This movement continues until the latching prong 388 escapes from the third cam surface 428. Simultaneously, the spring arm 386 escapes abruptly from the crest 442 of the second ramp 440 and traverses the drop-off 444 until the spring arm 386 impacts or snaps against the valley 446 to produce a third audible click, indicating that the latching mechanism 382 has been unlatched, as shown in FIG. 28. The impetus for the abrupt movement of the spring arm 386 from the crest 442 to the valley 446 is provided by the resilient biasing action of the spring arm 386.

When the input shaft 234 is released, the carriage 264 is returned forwardly by its biasing spring 266. During the return movement, the fourth cam surface 430 travels along the latching prong 388. At the same time, the spring arm 386 encounters a third ramp 452 which is formed on the first cam lobe 416 and slopes upwardly from the valley 446, generally in the same direction as the slope of the second ramp 440. The spring arm 386 is deflected by the third ramp 452 until the latching prong 388 escapes abruptly from the first cam lobe 416 and impacts or snaps abruptly against the flat surface 432 of the ramp member 414 to produce a fourth audible click, indicating that the latching mechanism 382 has been returned to its original position, as shown in FIG. 25.

Figure 29:
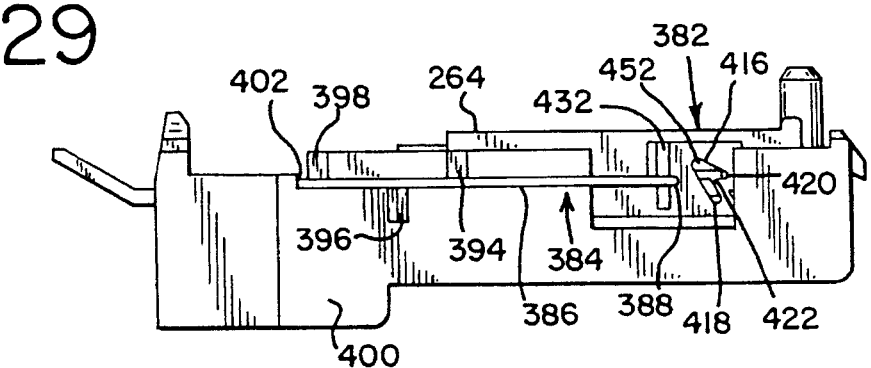
FIG. 29 is an enlarged longitudinal view of a subassembly of the switch of FIG. 20, showing the recirculation switch housing, the carriage in such housing, the latching cam and other latching components on such carriage, and the spring latch on the housing and engaging the latching components, the latching mechanism being shown in its initial position.
Figure 30:
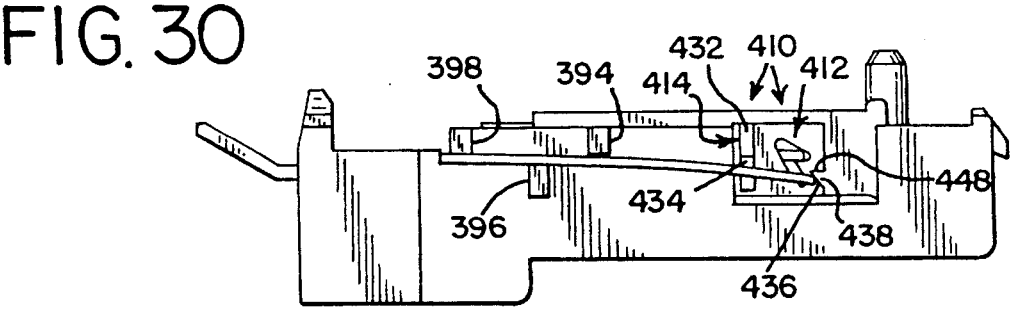
FIG. 30 is a view similar to FIG. 29, but showing the latching mechanism in its second position at the end of the first push.
Figure 31:
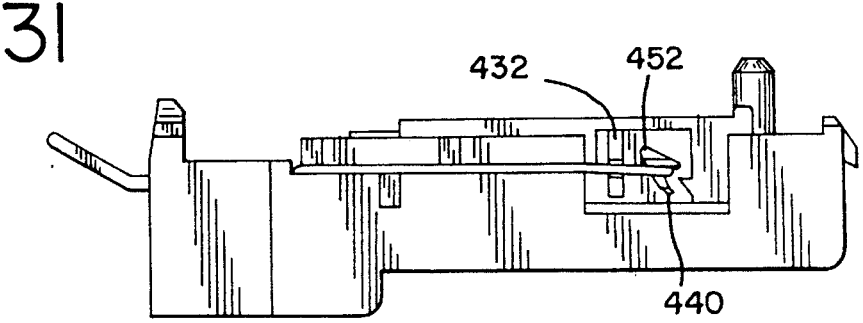
FIG. 31 is a view similar to FIG. 29, but showing the latching mechanism in its fully latched position, at the end of the first releasing movement of the push-push control member.
Figure 32:
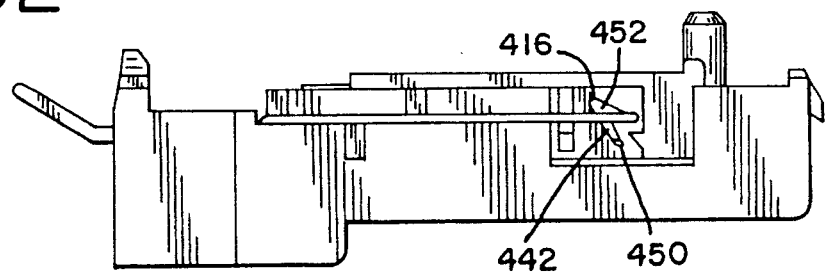
FIG. 32 is a view similar to FIG. 29, but showing the latching mechanism in its position at the end of the second push of the control member.

FIGS. 29, 30, 31 and 32 are longitudinal views showing the latching mechanism 382 in the same successive four positions shown in FIGS. 25, 26, 27 and 28, respectively. Thus, FIG. 29 shows the latching mechanism 382 in its initial or home position. FIG. 30 shows the position of the latching mechanism 382 when the input shaft 234 and the switch carriage 264 have been pushed rearwardly for the first time. FIG. 31 shows the fully latched position of the latching mechanism 382, after the input shaft 234 has been released and the carriage 264 has been partially returned in the forward direction, to the right in FIG. 31. FIG. 32 shows the position of the latching mechanism 382 after the input shaft 234 and the switch carriage 264 have been pushed rearwardly for the second time, to unlatch the latching mechanism 382. When the input shaft 234 and the switch carriage 264 are again released, the latching mechanism 382 returns to its initial or home position, shown in FIG. 29.

Figure 41A:
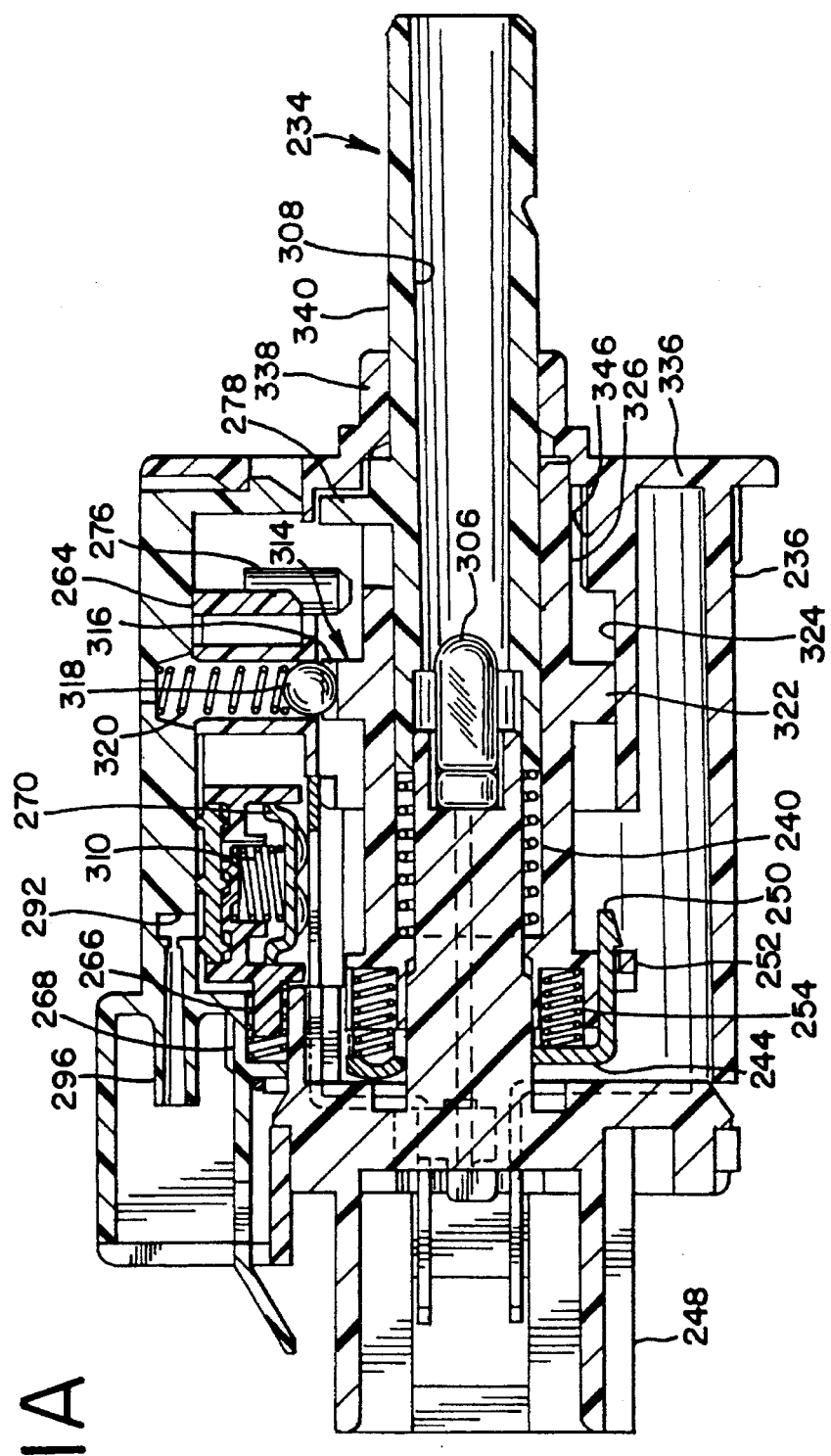
FIG. 41A is a view similar to FIG. 41, but showing the push-push vacuum-electric switch in its actuated, latched position.

FIG. 41 shows the push-push vacuum-electric switch 232 in its initial or OFF position. FIG. 41A shows the switch 232 in its fully latched ON or actuated position.

FIG. 43 is a table showing the switching functions of the rotary blower switch 230 and the push-push recirculation control vacuum-electric switch 232. The functions of the blower switch 230 correlate with the previous description. The purpose of the blower switch 230 is to regulate the speed of the blower motor. The blower switch 230 has five rotary positions, designated OFF, LOW, MEDIUM LOW, MEDIUM HIGH and HIGH. In FIG. 43, the circuits which are made or closed in the five positions are identified by the numbers of the terminals which are connected together. The correlation of the terminal numbers and the corresponding reference characters is shown in TABLE 1 and also in FIG. 42.

In FIG. 43, the second portion of the table shows the vacuum and electrical switching functions of the push-push recirculation vacuum-electric switch 232. In this part of the table, the legend PORT A (SOURCE) correlates with the port 290 in FIG. 34 and also with the terminal nipple 294 in FIG. 24. The legend PORT B (RECIRC.) correlates with the port 292 in FIG. 34 and also with the terminal nipple 296 in FIG. 24. In the OFF position of the switch 232, vacuum is supplied to the port 290 from an external source connected to the terminal nipple 294. The vacuum is sealed by the valve member 280 which seals the port 290. The port 292 is connected to the atmosphere.

In the ON position of the switch 232, the valve member 280 of FIG. 34 connects the ports 290 and 292 so that vacuum is supplied to the port 292.

FIG. 44 shows the terminal functions of the terminals designated 1 through 8, which correlate with the terminals 371 through 378. FIG. 44 correlates with TABLE 1.

FIG. 45 illustrates an improved and highly advantageous control apparatus or system 460 for the previously mentioned automotive heating, ventilating and air conditioning system 299 which may also be referred to as the air control system. The control apparatus or system 460 includes the push-push latching A/C SWITCH 50, the rotary BLOWER SWITCH 230 and the push-push latching VACUUM SWITCH 232.

As previously indicated, the terminal nipple 294 of the vacuum switch 232 is connected to the VACUUM SOURCE 293 by a vacuum input line 461. The terminal nipple 296 is connected by a vacuum output line 463 to the VACUUM RECIRCULATION OPERATOR 295 which may take the form of a vacuum operated motor or other control device for operating a movable RECIRCULATION DOOR or valve member 297, adapted to shut off most or all of the outside air and to cause air to recirculate in the automotive heating, ventilating and air conditioning system 299.

The BLOWER SWITCH 230 is employed to regulate the speed of a BLOWER MOTOR 462 for causing air to move in the system 299. For this purpose, a conventional RESISTOR ASSEMBLY 464 is connected between the BLOWER SWITCH 230 and the BLOWER MOTOR 462. The resistor assembly 464 may be of the standard type having a plurality of resistors which may be selectively connected in series between the positive battery terminal B+ and one input terminal 466 of the BLOWER MOTOR 462. As shown, the other input terminal 468 of the motor 462 is connected to GROUND, to which the negative terminal of the battery is also connected. As shown, the switch terminals 371, 372, 373, 375 and 377 are connected to the RESISTOR ASSEMBLY 464. The switch terminal 377 is also connected to the B+ terminal. The BLOWER SWITCH 230 is generally operative to connect a selected number of the resistors in the RESISTOR ASSEMBLY 464 in series with the blower motor 462.

As shown in FIG. 45, the terminal 376 of the BLOWER SWITCH 230 is connected by a lead or wire 470 to one terminal of the A/C SWITCH 50, while another lead 472 is connected between the other terminal of the switch 50 and one terminal of an A/C CLUTCH 474. The other terminal of the A/C CLUTCH 474 is connected to GROUND. The BLOWER SWITCH 230 has an OFF position in which the terminal 376 is not energized. In the OFF position, the BLOWER MOTOR 462 is also not energized. In all other positions of the BLOWER SWITCH 230, the terminal 376 is connected to the B+ terminal 377, so that the A/C SWITCH 50 is energized. When the A/C SWITCH 50 is operated to its ON or closed position, the A/C CLUTCH 474 is energized so that the air conditioning compressor (not shown) is operative.

The control apparatus or system 460 is highly advantageous and economical, in that the VACUUM SWITCH 232 directly controls the supply of vacuum to the RECIRCULATION OPERATOR 295 without any need for a relay device or the like. The VACUUM SWITCH 232 is directly combined with the BLOWER SWITCH 230 so that the single input shaft 234 is operative to control both switches 230 and 232.

Various other modifications, alternative constructions and equivalents may be employed without departing from the true spirit and scope of the present invention, as described herein and as defined in the following claims.

I claim:

1. Vacuum switching and electrical switching control apparatus for an automotive air control system having an electrically operable blower motor, a vacuum source, a recirculation control device for changing between outside air and recirculation of air, and a vacuum motor for operating the recirculation control device, said control apparatus comprising a rotary electrical blower switch having an input shaft which is rotatable to a plurality of positions for controlling the operation and speed of the blower motor, said blower switch having fixed electrical contact means and cooperative movable electrical contact means operable by rotation of said shaft for selectively controlling the operation and speed of the blower motor, said blower switch having means for connecting said fixed and movable contacts in circuit with the blower motor, said input shaft also being pushable rearwardly, said blower switch having resilient means for biasing said shaft forwardly, a vacuum switch combined with said electrical blower switch, a vacuum input line for connecting between the vacuum source and said vacuum switch, a vacuum output line for connecting between said vacuum switch and the vacuum motor, said vacuum switch having control means operable by rearward and forward movement of said input shaft for selectively making and breaking a vacuum-transmitting connection between said vacuum input line and said vacuum output line for selectively energizing and de-energizing the vacuum motor in response to rearward and forward movement of said input shaft for selectively operating the recirculation control device to change between outside air and recirculation.

2. Control apparatus according to claim 1, in which said vacuum switch includes a latching mechanism for alternately latching said vacuum switch in its make position and returning said vacuum switch to its break position.

3. Control apparatus according to claim 1, in which said vacuum switch comprises a push-push latching mechanism operable by successive rearward pushing movements of said input shaft for alternately latching said vacuum switch in its make position and unlatching said vacuum switch for return movement to said break position for alternately energizing and de-energizing the vacuum motor.

4. Control apparatus according to claim 1, in which said vacuum switch includes spring means for biasing said vacuum switch toward its break position, said vacuum switch including a latching mechanism for alternately latching said vacuum switch in its make position and unlatching said vacuum switch for return movement to its break position by said spring means.

5. Control apparatus according to claim 1, in which said vacuum switch includes spring means for biasing said vacuum switch toward its break position, said vacuum switch comprising a push-push latching mechanism operable by successive rearward pushing movements of said input shaft for alternately latching said vacuum switch in its make position and unlatching said vacuum switch for return movement by said spring means to said break position for alternately energizing and de-energizing the vacuum motor.

6. Vacuum switching and electrical switching control apparatus for an automotive air control system having an electrically operable blower motor, a vacuum source, a recirculation control device for changing between outside air and recirculation of air, and a vacuum motor for operating said recirculation control device, said control apparatus comprising a rotary electrical blower switch having an input shaft which is rotatable to a plurality of positions for controlling the speed of the blower motor, said electrical blower switch having fixed electrical contact means and cooperative movable electrical contact means operable by rotation of said shaft for selectively controlling the speed of the blower motor, said blower switch having means for connecting said fixed and movable contacts in circuit with the blower motor, said input shaft also being movable axially between outside air and recirculation positions, a vacuum switch combined with said electrical blower switch, a vacuum input line for connecting between said vacuum source and said vacuum switch, a vacuum output line for connecting between said vacuum switch and the vacuum motor, said vacuum switch having control means operable by axial movement of said input shaft between its outside air and recirculation positions for selectively making and breaking a vacuum-transmitting connection between said vacuum input line and said vacuum output line for selectively energizing and de-energizing the vacuum motor in response to axial movement of said input shaft between said recirculation and outside air positions for selectively operating the recirculation control device to change between outside air and recirculation.

7. Control apparatus according to claim 6, including resilient means for biasing said input shaft toward its outside air position.

8. Control apparatus according to claim 7, in which said vacuum switch comprises a latching mechanism for alternately latching said vacuum switch in its make position and returning said vacuum switch to its break position.

9. Control apparatus according to claim 7, in which said vacuum switch comprises spring means for biasing said vacuum switch toward its break position, said vacuum switch comprising a latching mechanism for alternately latching said vacuum switch in its make position and releasing said vacuum switch for movement by said spring means to its break position.

10. Control apparatus according to claim 7, in which said vacuum switch comprises spring means for biasing said vacuum switch toward its break position, said vacuum switch comprising a latching mechanism operable by successive movements of said input shaft to its recirculation position for alternately latching said vacuum switch in its make position and unlatching said vacuum switch for return movement to its break position for alternately energizing and de-energizing the vacuum motor.

\* \* \* \* \*